(12) United States Patent
Masumoto

(10) Patent No.: US 10,564,904 B2
(45) Date of Patent: Feb. 18, 2020

(54) IMAGE FORMING APPARATUS WITH SECURITY FEATURE, COMPUTER-READABLE RECORDING MEDIUM STORING PROGRAM, AND IMAGE FORMING SYSTEM

(71) Applicant: Konica Minolta, Inc., Chiyoda-ku, Tokyo (JP)

(72) Inventor: Kosuke Masumoto, Hachioji (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 39 days.

(21) Appl. No.: 15/597,465

(22) Filed: May 17, 2017

(65) Prior Publication Data

US 2018/0004463 A1   Jan. 4, 2018

(30) Foreign Application Priority Data

May 17, 2016 (JP) ................... 2016-098384

(51) Int. Cl.
*G06F 3/12*   (2006.01)
*H04N 1/44*   (2006.01)

(52) U.S. Cl.
CPC .......... *G06F 3/1238* (2013.01); *G06F 3/1204* (2013.01); *G06F 3/1222* (2013.01); *G06F 3/1259* (2013.01); *G06F 3/1267* (2013.01); *G06F 3/1285* (2013.01); *H04N 1/44* (2013.01); *H04N 1/4406* (2013.01); *H04N 1/4426* (2013.01); *H04N 2201/0094* (2013.01)

(58) Field of Classification Search
None
See application file for complete search history.

(56) References Cited

U.S. PATENT DOCUMENTS

| 2014/0160505 A1* | 6/2014 | Tachikawa | H04N 1/00323 358/1.13 |
| 2017/0041503 A1* | 2/2017 | Nobutani | H04N 1/442 |
| 2017/0155793 A1* | 6/2017 | Masumoto | G06F 3/1204 |

FOREIGN PATENT DOCUMENTS

| JP | 2010-135993 A | 6/2010 |
| JP | 2011-41132 A | 2/2011 |

* cited by examiner

*Primary Examiner* — Mohammad H Ghayour
*Assistant Examiner* — Pawan Dhingra
(74) *Attorney, Agent, or Firm* — Buchanan Ingersoll & Rooney PC

(57) ABSTRACT

An image forming apparatus causes an image forming portion to perform image forming processing based on a security job issued by an output-permitted user, in a case where an outsider-use-possibility calculated by an outsider-use-possibility calculation portion becomes equal to or smaller than a predetermined threshold value on the basis of information of a movement trajectory of the output-permitted user and also the output-permitted user has been detected in an output-process-start area. Accordingly, it is possible to enhance the convenience for the output-permitted user while ensuring the security of the output product based on the security job issued by the user.

25 Claims, 17 Drawing Sheets

| NUMBER OF SHEETS IN JOB | OUTPUT-PROCESS-START DISTANCE |
|---|---|
| 1SHEET | 0.5m |
| 2SHEETS | 1m |
| 3SHEETS | 1.5m |
| 4SHEETS | 2m |

| MANAGEMENT NUMBER | JOB TYPE | OUTPUT-PROCESS-START DISTANCE |
|---|---|---|
| FN1 | SHEET FOLDING | 2m |
| FN2 | CUTTING | 1m |
| FN3 | STAPLING | 0.5m |
| FN4 | BOOKBINDING | 3m |

FIG. 13

| JOB TYPE COMBINATION | SUMMED DISTANCE |
|---|---|
| CUTTING + STAPLING | 1.5m |
| SHEET FOLDING + STAPLING | 2.5m |
| SHEET FOLDING + CUTTING | 3m |
| SHEET FOLDING + CUTTING + STAPLING | 3.5m |
| STAPLING + BOOKBINDING | 3.5m |
| CUTTING + BOOKBINDING | 4m |
| CUTTING + STAPLING + BOOKBINDING | 4.5m |
| SHEET FOLDING + BOOKBINDING | 5m |
| SHEET FOLDING + STAPLING + BOOKBINDING | 5.5m |
| SHEET FOLDING + CUTTING + BOOKBINDING | 6m |
| SHEET FOLDING + CUTTING + STAPLING + BOOKBINDING | 6.5m |

| MOVEMENT DIRECTION OF OUTSIDER | OUTSIDER-USE-POSSIBILITY |
|---|---|
| APPROACHING DIRECTION | 95% |
| CROSSING DIRECTION | 70% |
| NO MOVEMENT | 50% |
| LEAVING DIRECTION | 30% |
| FURTHER LEAVING DIRECTION | 10% |

| MOVEMENT DIRECTION OF OUTSIDER | OUTSIDER-USE-POSSIBILITY | | |
|---|---|---|---|
| | USER DISTANCE: 5m | 3m | 1m |
| APPROACHING DIRECTION | 95% | 100% | 100% |
| CROSSING DIRECTION | 70% | 80% | 100% |
| NO MOVEMENT | 50% | 60% | 70% |
| LEAVING DIRECTION | 30% | 40% | 50% |

| FACTOR | ELEMENT | THRESHOLD VALUE VARIATION COEFFICIENT |
|---|---|---|
| SECURITY LEVEL | HIGH | -20% |
| | LOW | 0% |
| TIME ZONE | MORNING | -20% |
| | AFTER LUNCH BREAK | -10% |
| | NIGHT | 0% |
| SCHEDULE | BEFORE MEETING | -30% |
| | AFTER MEETING | 0% |
| ASSIGNMENT | MANAGERIAL | -30% |
| | CLERICAL | 0% |
| CONTENT | PERSONNEL DOCUMENTS | -30% |
| | FINANCIAL DOCUMENTS | -30% |
| | TECHNICAL DOCUMENTS | -30% |
| | OTHERS | -10% |
| TRUST RELATIONSHIP | COMPANY STAFF (SAME DEPARTMENT) | 10% |
| | COMPANY STAFF (DIFFERENT DEPARTMENT) | 0% |
| | COMPANY STAFF (DIFFERENT OFFICE) | -20% |
| | OUTSIDER | 20% |

| USER DISTANCE | THRESHOLD VALUE |
|---|---|
| 5m | 0% |
| 4m | 10% |
| 3m | 40% |
| 2m | 60% |
| 1m | 70% |
| 0.5m | 80% |

IMAGE FORMING APPARATUS WITH SECURITY FEATURE, COMPUTER-READABLE RECORDING MEDIUM STORING PROGRAM, AND IMAGE FORMING SYSTEM

BACKGROUND OF THE INVENTION

Field of the Invention

The present invention relates to an image forming apparatus, a computer-readable recording medium storing a program, and an image forming system.

Description of the Related Art

Conventionally, there is an image forming apparatus having a security printing function for preventing information leakage by outsiders taking away or peeking at an output product (printed matter) which has been output on a sheet receiving tray of an image forming apparatus. The image forming apparatus has preliminarily set, in a print job, information of an output-permitted user who is authorized to execute printing according to the print job, and the image forming apparatus starts printing according to the print job when an authentication device attached to the image forming apparatus has authenticated the output-permitted user. Hereinafter, a print job having information of an output-permitted user set therein is referred to as a "security job".

As a technique for ensuring security of a printed matter which has been output on the basis of a security job in an image forming apparatus having a security printing function, there is known a technique of performing an authentication operation in front of the image forming apparatus, by an output-permitted user. The authentication operation is performed by, for example, causing a card reader attached to the image forming apparatus to read personal identification information on an IC (Integrated Circuit) card carried by the output-permitted user. Printing based on the security job is started in a state where the output-permitted user exists near the image forming apparatus, by causing the output-permitted user to perform such an authentication operation, and thus there can be prevented occurrence of a problem that an output product passes into the hands of a user other than the output-permitted user.

When such an authentication operation is performed, the output-permitted user is required to wait in front of the image forming apparatus until the printing based on the security job is completed. This is because, when an outsider comes nearby the image forming apparatus while the printing based on the security job is being performed, an output product ejected on the sheet receiving tray may be peeked at by the outsider. Security of a security-job-based output product may be impaired when the outsider peeks at the output product. Although the output-permitted user's waiting time may not become so long in a case or the like where the number of sheets of the output products is small, the time from start to end of the printing based on the security job becomes longer in a case where the number of sheets of the output products is large, or where there are many processes of post-processing performed after the printing, thereby resulting in a longer waiting time for the output-permitted user.

In order to solve the problem described above, there has been conventionally proposed an approach of causing an output-permitted user to perform remote login to an image forming apparatus, and causing the image forming apparatus to start an output process of printing based on the security job when the remote login of the output-permitted user has been performed (refer to, for example, Japanese Patent Laid-Open No. 2011-41132 and Japanese Patent Laid-Open No. 2010-135993).

Japanese Patent Laid-Open No. 2011-41132 discloses a technique of calculating the distance between a user and a multi-function printer on the basis of the strength of radio wave emitted from an identification information transmission device carried by the user, and of starting the print operation when the user's approach to the multi-function printer or entering within a predetermined distance has been detected. In addition, Japanese Patent Laid-Open No. 2010-135993 discloses a technique of causing a multi-function printer to start a warm-up process in a case where the distance between a person and the multi-function printer has become equal to or smaller than a threshold distance that has been preliminarily set on the basis of information relating to the average walking speed of humans and the warm-up time of the multi-function printer.

SUMMARY OF THE INVENTION

The use of the techniques described in respective Patent Literatures makes it possible to reduce the time an output-permitted user has to wait for completion of outputting a security-job-based output product. Namely, it is possible to enhance the convenience for the output-permitted user. However, the techniques disclosed in Patent Literatures 1 and 2 start an output process of printing at the time when the output-permitted user has approached the image forming apparatus within a predetermined distance, even in a case where an outsider having an intention of using the image forming apparatus exists near the image forming apparatus.

In addition, it is very likely that an outsider having an intention of using the image forming apparatus may approach the image forming apparatus even in a case where the outsider does not exist near the image forming apparatus at the time when the output-permitted user has approached the image forming apparatus within a predetermined distance. Furthermore, the outsider may overtake the output-permitted user and reach the image forming apparatus ahead of the output-permitted user, when the outsider moves quickly. In such a case, even when the techniques described in the respective patent literatures are used, an outsider having an intention of using then image forming apparatus peeks at an output product that has been output on the basis of the security job issued by the output-permitted user.

The present invention has been made in order to solve the problems described above. An object of the present invention is to ensure the security of an output product which has been output on the basis of a security job issued by an output-permitted user, and at the same time, to enhance the convenience for the output-permitted user.

In order to solve the problems described above, an image forming apparatus reflecting an aspect of the present invention includes:

a job acquisition portion configured to acquire a print job issued from a communication terminal operated by a user;

an image forming portion configured to perform image forming processing to form an image on a sheet on a basis of the print job;

a user detection portion configured to detect the user existing in a detectable area;

a user determination portion configured to determine whether or not the user detected by the user detection portion is an output-permitted user who has issued a security job that requires user authentication;

an authentication portion configured to authenticate the user who has been determined to be the output-permitted user by the user determination portion;

an outsider detection portion configured to detect an outsider other than the output-permitted user existing in an outsider detection area;

an output-process-start distance calculation portion configured to calculate, on a basis of a content of the security job acquired by the job acquisition portion, an output-process-start distance defining an output-process-start area in which the image forming portion is allowed to perform image forming processing based on the security job;

a movement trajectory calculation portion configured to calculate a trajectory of movement of the outsider detected by the outsider detection portion;

an outsider-use-possibility calculation portion configured to calculate, on a basis of the movement trajectory calculated by the movement trajectory calculation portion, an outsider-use-possibility indicating a possibility of using a target apparatus by the outsider; and an image forming control portion configured to perform a control of causing the image forming portion to perform image forming processing based on the security job issued by the output-permitted user, in a case where the use-possibility calculated by the outsider-use-possibility calculation portion becomes equal to or smaller than a predetermined threshold value and also the output-permitted user has been detected in the output-process-start area.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 11 is a configuration diagram of a number-of-sheets-in-job/distance conversion table according to an embodiment of the present invention.

FIG. 12 is configuration diagram of a job type/distance conversion table according to an embodiment of the present invention.

FIG. 13 is an explanatory diagram illustrating relations between examples of combination of job types and sums of the output-process-start distances in respective examples according to an embodiment of the present invention.

FIG. 15 is a configuration diagram of an outsider-use-possibility table according to an embodiment of the present invention.

FIG. 16 is a configuration diagram of a threshold value variation factor table according to an embodiment of the present invention.

FIG. 17 is a configuration diagram of a threshold value modification table according to an embodiment of the present invention.

DESCRIPTION OF THE PREFERRED EMBODIMENTS

Figure 1:
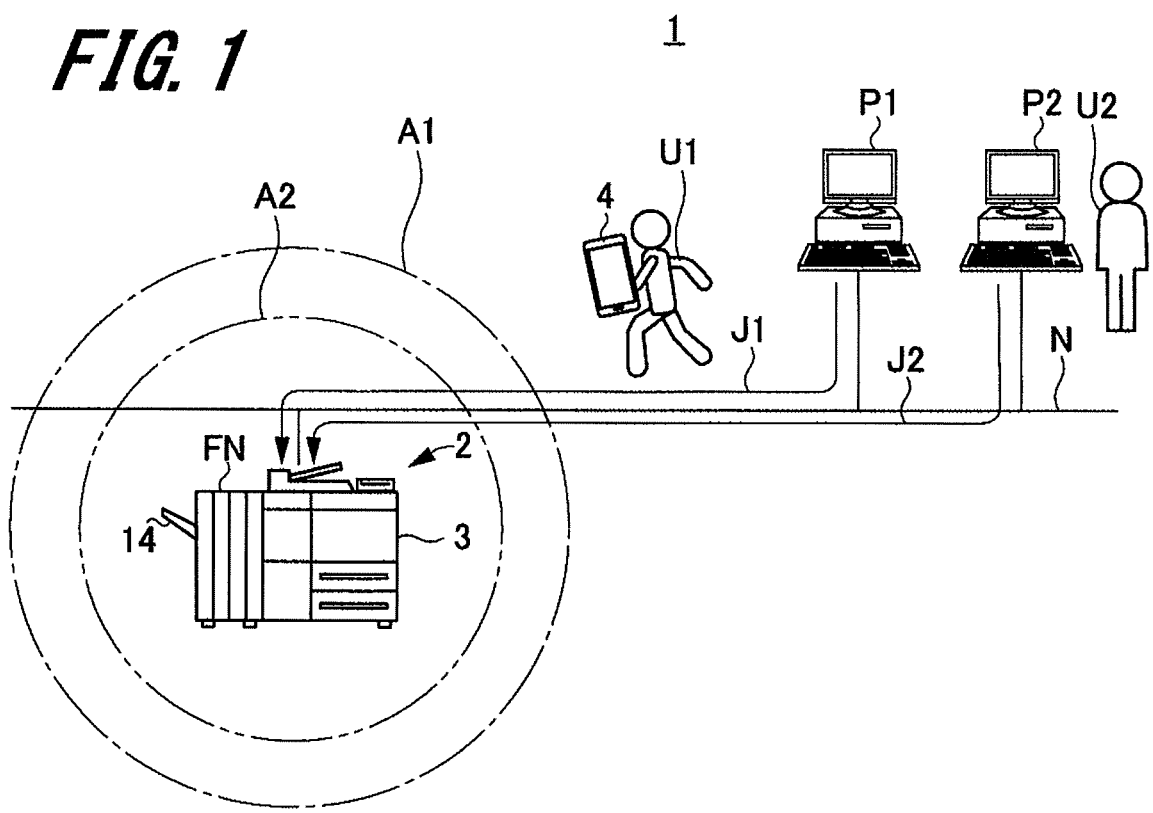
FIG. 1 is a schematic view of an image forming system according to an embodiment of the present invention.

Hereinafter, an embodiment of the present invention will be described with reference to the drawings. However, the scope of the invention is not limited to the illustrated examples.

An exemplary embodiment for implementing the present invention will be described below with reference to the attached drawings. In the specification and the drawings, the same reference numerals are attached to constituent elements having substantially the same functions or configurations, and duplicated explanation thereof is omitted.

<Outline of Image Forming System>

First, an outline of an image forming system according to an embodiment of the present invention will be described with reference to FIG. 1. FIG. 1 is a schematic view of an image forming system according to an embodiment of the present invention.

An image forming system 1 includes an image forming apparatus 2, PC (Personal Computer) terminals P1 and P2 (exemplary communication terminals), and a terminal device 4 carried by an output-permitted user U1, as illustrated in FIG. 1. The image forming apparatus 2 is connected to respective PC terminals (PC terminals P1 and P2) via a network N such as a wireless or wired LAN (Local Area Network).

The image forming apparatus 2 includes an image forming apparatus main body 3 that forms an image on a sheet, a post-processing device FN that performs predetermined post-processing on a sheet (output product) having an image formed thereon, ejected from the image forming apparatus main body 3 and a sheet receiving tray 14. Details of the configurations of the image forming apparatus main body 3 and the post-processing device FN will be described in detail below with reference to FIG. 9.

The sheet receiving tray 14 is a tray which receives sheets having images formed thereon by the image forming apparatus main body 3 and subjected to post-processing by the post-processing device FN. The output-permitted user U1 and an unpermitted user U2 can acquire sheets ejected on the sheet receiving tray 14. Note that the image forming apparatus 2 can adopt a configuration in which the post-processing device FN is not provided at the latter stage of the image forming apparatus main body 3, and in such a case, the sheet receiving tray 14 is directly attached to the image forming apparatus main body 3.

The PC terminal P1 is a communication terminal operated by the output-permitted user U1 who issues a security job J1, and outputs the issued security job J1 to the image forming apparatus 2 via the network N. The security job J1 is a print job in which a setting for using a security printing function is performed, and there is written, in the security job J1, an owner ID that is identification information of the user who has issued the security job J1.

The output process of a printed matter based on the security job J1 is executed after the login authentication via the remote login of the output-permitted user U1 has been performed by the image forming apparatus 2. The remote login of the output-permitted user U1 is performed by the image forming apparatus 2 at the time when the image forming apparatus 2 detects that the output-permitted user U1 has reached a detectable area A1 in which the image forming apparatus 2 can detect the output-permitted user U1. Note that, in the following explanation, the output-permitted user U1 who has issued the security job J1 is also referred to as a security job owner.

The PC terminal P2 is a communication terminal device operated by the unpermitted user U2 who issues a normal job J2, and outputs the issued normal job J2 to the image forming apparatus 2 via the network N. The normal Job J2 is a print job that does not require login authentication. Therefore, the image forming apparatus 2 immediately performs printing processing upon receiving the normal job J2 issued by the PC terminal P2. In the following explanation, the unpermitted user U2 who has issued the normal job J2 is also referred to as a normal job owner. The normal job J2 also has an owner ID included therein, and the owner ID coincides with the user ID of the unpermitted user U2.

Note that, in the following explanation, when it is not necessary to distinguish between the security job J1 and the normal job J2, each of the jobs is simply referred to as a "print job", and when it is not necessary to distinguish between a security job owner and a normal job owner, each of the jobs is simply referred to as a "user".

In addition, although FIG. 1 illustrates an example in which the PC terminal P1 issues the security job J1 and the PC terminal device P2 issues the normal job J2, the present invention is not limited thereto. The PC terminal P1 may issue the normal job J2, and the PC terminal P2 may issue the security job J1.

The terminal device 4 is a portable terminal device held by a user, and includes, for example, a smart device such as smart phone or a tablet, or a cell phone and the like. The terminal device 4 has set therein a user ID for identifying a user, and transmits the user ID to the image forming apparatus main body 3 via short-distance wireless communication. Bluetooth (registered trademark), WiFi (registered trademark) or the like, for example, may be used as the standard of short-distance wireless communication.

When the image forming apparatus main body 3 receives a user ID transmitted from the terminal device 4, the main body 3 collates the received user ID and the owner ID written in the print job. In a case where the received print job is the security job J1 and the user ID coincides with the owner ID, the image forming apparatus main body 3 authenticates the user holding the terminal device 4 as the output-permitted user U1. Then, the image forming apparatus main body 3 starts output process of the printed matter at the time when it is detected that the output-permitted user U1 has reached an output-process-start area A2 which is set as a substantial circular area with the image forming apparatus main body 3 being at the center thereof. The output-process-start area A2 will be described in detail below with reference to FIG. 2.

The output process of a printed matter is image forming processing performed on the basis of a print job, and when post-processing is set in the print job, the output process includes a process of the post-processing. In addition, a warm-up process is performed in the image forming apparatus 2 before the image forming processing when the mode of the image forming apparatus 2 is a power-saving mode, and the warm-up process is also included in output process of the printed matter.

Figure 2:
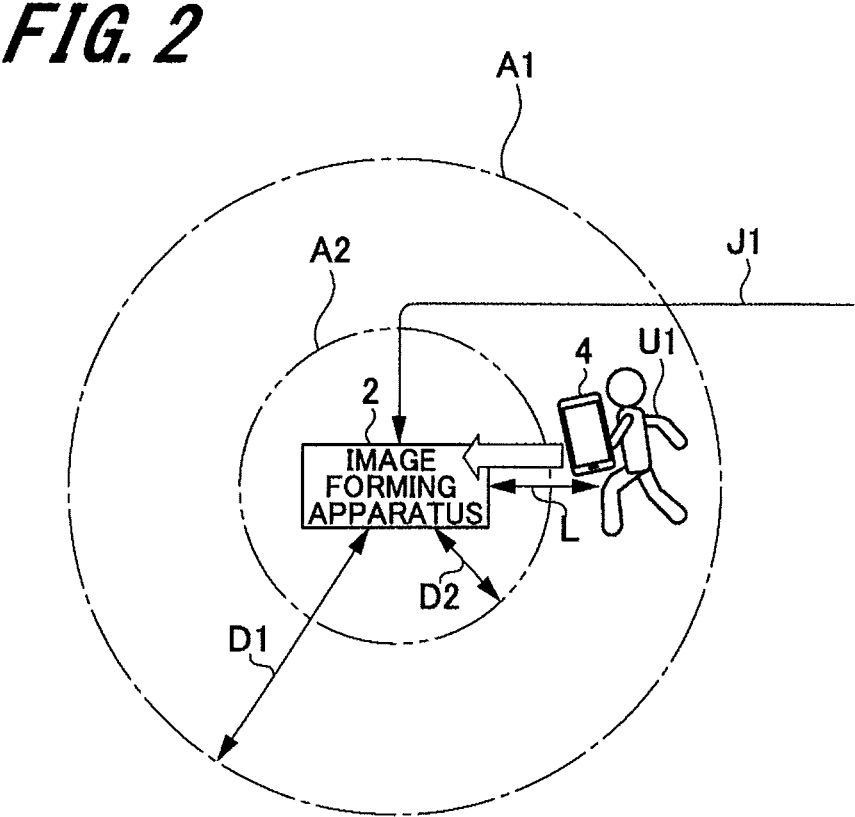
FIG. 2 is an explanatory diagram illustrating a detectable area, a user-detectable distance defining the detectable area, an output-process-start area, an output-process-start distance defining the output-process-start area, and a user distance according to an embodiment of the present invention.

Next, the detectable area A1 and the output-process-start area A2 will be described with reference to FIG. 2. FIG. 2 is an explanatory diagram illustrating the detectable area A1, the output-process-start area A2, and a user distance L that is the distance between the image forming apparatus 2 and the user.

The detectable area A1 is a substantial circular area centering around the image forming apparatus 2 with a user-detectable distance D1 being the radius thereof, as illustrated in FIG. 2. For example, the user-detectable distance D1 is set to be a distance within which the image forming apparatus 2 can detect radio waves emitted from the terminal device 4 held by the output-permitted user U1.

The output-process-start area A2 is a substantial circular area centering around the image forming apparatus 2 with an output-process-start distance D2 being the radius thereof. The output-process-start area A2 is an area in which the image forming apparatus 2, in a case of detecting the output-permitted user U1 in the area, can start an output process of the printed matter on the basis of the security job issued by the output-permitted user U1. The image forming apparatus 2 according to an embodiment of the present invention performs a process of changing the output-process-start distance D2 to a length in accordance with the content of the job set in the security job, and the process of changing the output-process-start distance D2 will be described below.

Determination of whether or not the output-permitted user U1 has reached the output-process-start area A2 is performed on the basis of information of whether or not the user distance L that is the distance between the output-permitted user U1 and the image forming apparatus main body 3 has become equal to or smaller than the output-process-start distance D2. Note that the determination process is performed by the image forming apparatus 2.

The user distance L can be obtained by converting the strength of the radio wave emitted by the terminal device 4 into a distance between the image forming apparatus main body 3 and the output-permitted user U1 (terminal device 4). Note that the starting point of the user distance L can be set, for example, to an installation position of the sheet receiving tray 14 (refer to FIG. 1) of the image forming apparatus 2, or may be set to a position other than the position where the sheet receiving tray 14 is placed, for example, an arbitrary position on the image forming apparatus main body 3.

There is also assumed a case where the unpermitted user U2 exists around the image forming apparatus main body 3 when the output-permitted user U1 has reached the output-process-start area A2. Also in such a case, when the image forming apparatus 2 has started output process at the timing when the output-permitted user U1 has reached the output-process-start area A2, the unpermitted user U2 peeks at the output product ejected on the sheet receiving tray 14, as a result of output process.

Figure 3A:
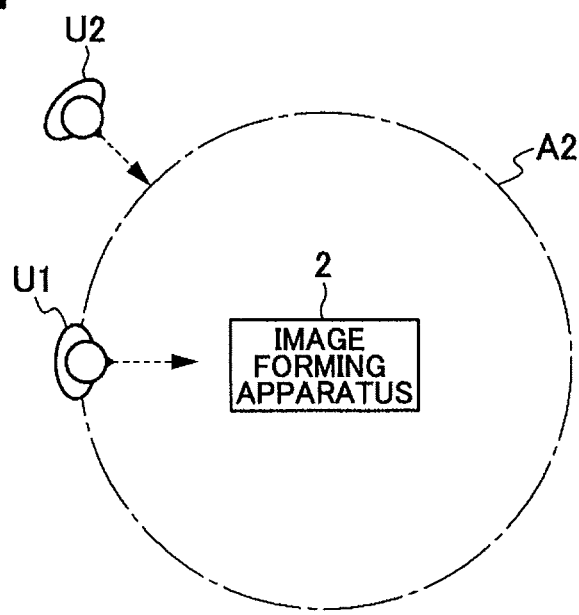
FIG. 3 is an explanatory diagram illustrating an example of case where it is very likely that an outsider having an intention of using the image forming apparatus may peek at an output product of a printed matter which has been output on the basis of a security job according to an embodiment of the present invention.

Additionally, even though the unpermitted user U2 does not exist at a position closer to the image forming apparatus 2 than the output-permitted user U1 when the output-permitted user U1 has reached the output-process-start area A2, there may be assumed a situation in which the unpermitted user U2 is approaching the image forming apparatus 2. FIG. 3A illustrates an example of occurrence of such a situation. In the example illustrated in FIG. 3A, the unpermitted user U2 exists at a position further from the image forming apparatus 2 than the output-permitted user U1 at the time when the output-permitted user U1 has reached the output-process-start area A2.

Figure 3B:
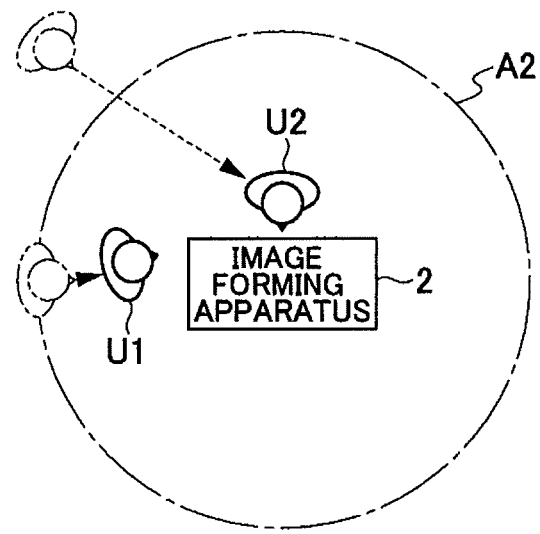

However, in a case where the unpermitted user U2 is a user having an intention of using the image forming apparatus 2, there is a possibility that the unpermitted user U2 may reach the position of the image forming apparatus 2 ahead of the output-permitted user U1. A user having an intention of using the image forming apparatus 2 refers to, for example, a user who has come to retrieve the output product which has been output on the basis of the normal job J2, or a user who want to use a copy function of the image forming apparatus 2. FIG. 3B illustrates an example of occurrence of such a situation. FIG. 3B illustrates, by two-dot chain lines, the positions of the output-permitted user U1 and the unpermitted user U2 when the output-permitted user U1 has entered the output-process-start area A2 as illustrated in FIG. 3A. In addition, there are illustrated, by solid lines, the positions of the output-permitted user U1 and the unpermitted user U2 when a predetermined time period has elapsed from the time point illustrated in FIG. 3A. Furthermore, the movement trajectories of the output-permitted user U1 and the unpermitted user U2 from the time point illustrated in FIG. 3A to the time point illustrated in FIG. 3B are illustrated by dashed-line arrows.

At the time point illustrated in FIG. 3B, the unpermitted user U2 who was at a position further from the image forming apparatus 2 than the output-permitted user U1 at the time point in FIG. 3A is moving to a position closer to the image forming apparatus 2 than the output-permitted user U1. Such a situation may occur when the unpermitted user U2 has an intention of using the image forming apparatus 2 and moves quickly to the position of the image forming apparatus 2. In such a case, the output product which has been output on the basis of the security job J1 issued by the output-permitted user U1 may be peeked at by the unpermitted user U2.

On the other hand, in a case where the unpermitted user U2 existing around the image forming apparatus 2 has no intention of using the image forming apparatus 2 and has just happened to pass by the image forming apparatus 2, the unpermitted user U2 is assumed to pass nearby the image forming apparatus 2 and head for another place after the situation at the time point illustrated in FIG. 3B. In such a case, there is a low possibility that the unpermitted user U2 may peek at the output product which has been output on the basis of the security job J1 even though output process is performed by the image forming apparatus 2 at the time when the output-permitted user U1 has entered the output-process-start area A2.

Accordingly, the present invention proposes the image forming system 1 having a configuration of being capable of determining, with a high precision, the possibility that the unpermitted user U2 existing around the image forming apparatus 2 uses the image forming apparatus 2, and of controlling the start-output timing of the security job J1 on the basis of the determination result.

Figure 4:
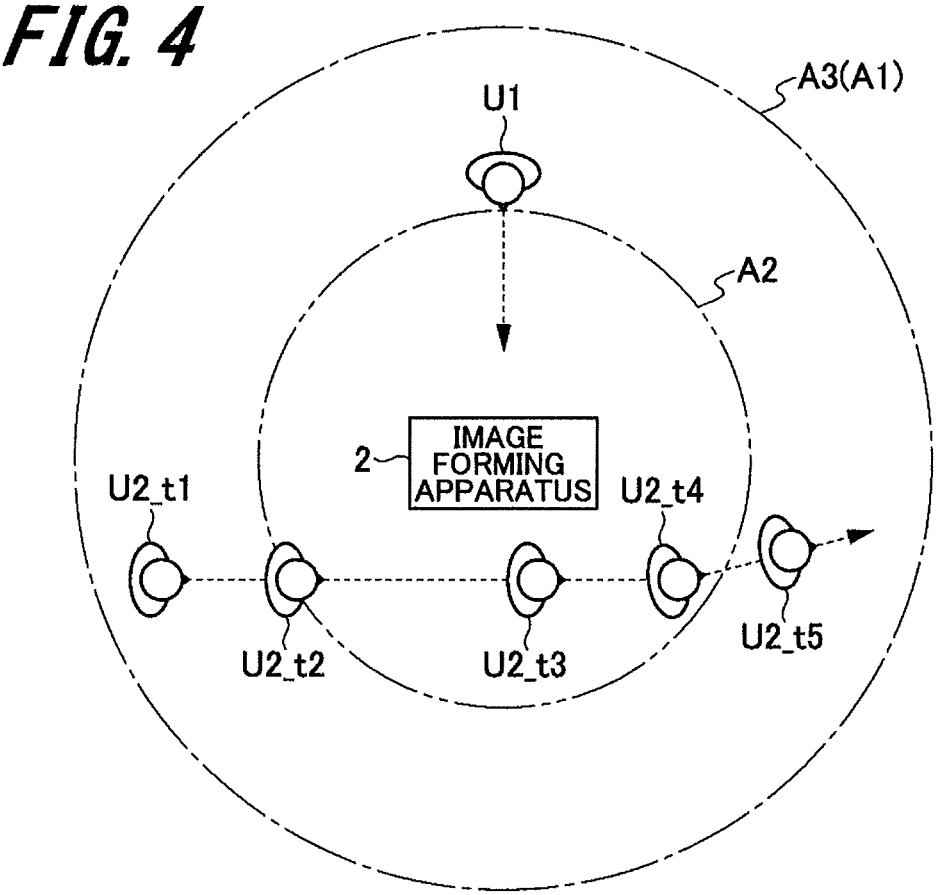
FIG. 4 is an explanatory diagram illustrating the relationship between a movement trajectory of an outsider and a possibility of the outsider's using the image forming apparatus according to an embodiment of the present invention.

Hereinafter, an outline of the output operation based on the security job J1 in the image forming system 1 according to the present embodiment will be described with reference to FIG. 4. FIG. 4 illustrates a situation in which the unpermitted user U2 is approaching the image forming apparatus 2 at the timing when the output-permitted user U1 enters the output-process-start area A2. In the example illustrated in FIG. 4, there is assumed a case where the unpermitted user U2 is moving rightward from the left hand side in the drawing. Note that, in FIG. 4, the movement trajectories of the users are illustrated by dashed-line arrows. Additionally, in FIG. 4, the change of positions during the movement of the unpermitted user U2 is illustrated as a position U2_t1, a position U2_t2, a position U2_t3, a position U2_t4, and a position U2_t5, in chronological order.

In the image forming system 1 of the present invention, an outsider-use-possibility is calculated for each time point at which the unpermitted user U2 existed at each position in the range from a position U2_t1 to a position U2_t5. The outsider-use-possibility is a value indicating the possibility that the unpermitted user U2 may use the image forming apparatus 2. Namely, the outsider-use-possibility is a value indicating the possibility that there is violated the security of the output product which has been output on the basis of the security job J1 issued by the output-permitted user U1. Then, the image forming system 1 of the present invention causes the image forming apparatus 2 to start an output process in a case where the output-permitted user U1 has been detected in the output-process-start area A2 and the outsider-use-possibility has become equal to or smaller than a predetermined threshold value. The outsider-use-possibility is calculated by the image forming apparatus 2 on the basis of information of the movement trajectory of the unpermitted user U2.

For example, with regard to the position U2_t1 and the position U2_t2 illustrated in FIG. 4, the unpermitted user U2 has come close to the image forming apparatus 2 and thus the possibility of using the image forming apparatus 2 is assumed to be high. In a case where the position and movement direction of the unpermitted user U2 are detected, the image forming apparatus 2 calculates a high value of the outsider-use-possibility such as 95%. In addition, with regard to the position U2_t3, the unpermitted user U2 is moving in a direction across the side the image forming apparatus 2. Although the possibility that the unpermitted user U2 making such a move may use the image forming apparatus 2 is still high, the possibility of using the image forming apparatus 2 by the unpermitted user U2 is assumed to be smaller than the case where the unpermitted user U2 is advancing toward the image forming apparatus 2 (the case of the position U2_t1, the position U2_t2, etc.). Therefore, in a case where the position and movement direction of the unpermitted user U2 are detected, the image forming apparatus 2 calculates a value such as 70% as the outsider-use-possibility.

In addition, the unpermitted user U2 at the position U2_t4 is moving in a direction away from the image forming apparatus 2. The possibility that the unpermitted user U2 making such a move may use the image forming apparatus 2 is assumed to be low. Accordingly, the image forming apparatus 2 calculates a low value such as 30% as the outsider-use-possibility in a case where such a position and movement direction of the unpermitted user U2 has been detected. Furthermore, the unpermitted user U2 at the position U2_t5 is moving in a direction further away from the image forming apparatus 2. The possibility that the unpermitted user U2 making such a move may use the image forming apparatus 2 is very low. Accordingly, in a case where such a position and movement direction are detected, the image forming apparatus 2 calculates a low value such as 25% as the outsider-use-possibility. Note that the determination of a "direction further away from" may be made when, for example, the movement direction of the unpermitted user U2 is a direction away from the image forming apparatus 2 and the user distance L of the unpermitted user U2 is equal to or larger than a predetermined distance.

Figure 5:
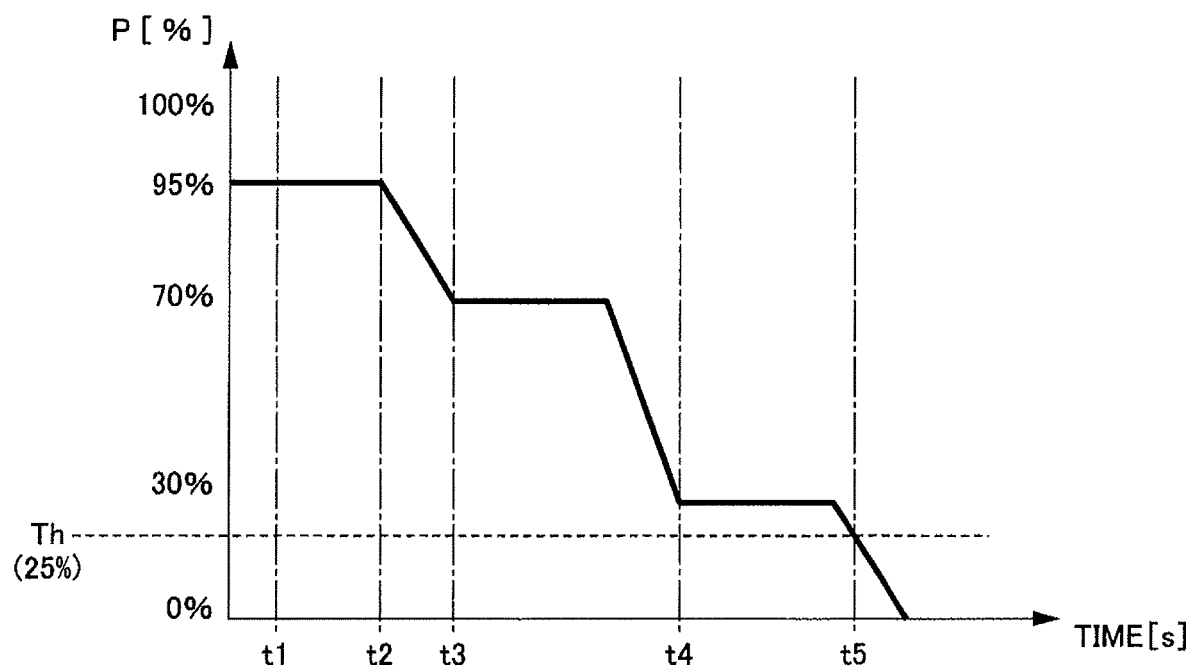
FIG. 5 is an explanatory diagram illustrating the relation between an outsider-use-possibility and a threshold value according to an embodiment of the present invention.

FIG. 5 is a graph illustrating the relation between an outsider-use-possibility P and a threshold value Th thereof. The vertical axis in FIG. 5 indicates the outsider-use-possibility P (%) and the horizontal axis indicates time (s). FIG. 5 is a graph indicating the variation property of the outsider-use-possibility P corresponding to the relation between the position of the unpermitted user U2 and the outsider-use-possibility P described in FIG. 4. Accordingly, time points t1 to t5 in FIG. 5 correspond, respectively, to the positions U2_t1 to U2_t5 in FIG. 4. Namely, the time point t1 illustrated in FIG. 5, for example, is the time when the unpermitted user U2 illustrated in FIG. 4 was positioned at the position U2_t1, and the time point t2 illustrated in FIG. 5 is the time when the unpermitted user U2 illustrated in FIG. 4 was positioned at the position U2_t2.

In the example illustrated in FIG. 5, the outsider-use-possibility P at the time point t1 is 95%, and the outsider-use-possibility P at the time point t2 is also 95%. In addition, the outsider-use-possibility P becomes 70% at the time point t3, the outsider-use-possibility P becomes 30% at the time point t4, and the outsider-use-possibility P becomes 25% at the time point t5.

Furthermore, in the example illustrated in FIG. 5, the threshold value Th of the outsider-use-possibility P is set to 25%, and the outsider-use-possibility P becomes the same value as the threshold value Th at the time point t5. The image forming apparatus 2 according to the present embodiment starts the output process of printing when the outsider-use-possibility P has become equal to or smaller than the threshold value Th. Namely, the output process by the image forming apparatus 2 is started when it is detected that the unpermitted user U2 exists at, for example, a position far from the image forming apparatus 2 such as the position U2_t5 in FIG. 4 and is moving in a direction away from the image forming apparatus 2.

As has been described above, the output process by the image forming apparatus 2 is started in the image forming system 1 according to the present embodiment when the outsider-use-possibility P has become equal to or smaller than the threshold value Th, namely, only when the possibility that the unpermitted user U2 may use the image forming apparatus 2 is determined to be low, in a case where the security job J1 has been set by the output-permitted user U1. Accordingly, it is possible to prevent the unpermitted user U2 who is very likely to use the image forming apparatus 2 (having an intention of using the image forming apparatus 2) from peeking at the output product that has been output on the basis of the security job J1 issued by the output-permitted user U1.

In addition, the image forming system 1 according to the present embodiment immediately starts the output process of printing in a case where the outsider-use-possibility P is low, even though the unpermitted user U2 exists around the image forming apparatus 2 at the time when the output-permitted user U1 has entered the output-process-start area A2. Therefore, according to the present invention, it is possible to reduce the waiting time of the output-permitted user U1 for completion of output process based on the security job J1, while preventing the unpermitted user U2 existing around the image forming apparatus 2 from peeking at the output product that has been output on the basis of the security job J1.

Note that calculation of the movement trajectory of the unpermitted user U2 advancing toward the image forming apparatus 2 is performed by the image forming apparatus 2, and the processing thereof is started at the time when the image forming apparatus 2 has detected the unpermitted user U2 within the outsider detection area A3 that is set as a range (area) of detecting the unpermitted user U2. Although, in the example illustrated in FIG. 4, the range of the outsider detection area A3 is set to be the same range as the range of the area detectable A1, the range of the outsider detection area A3 may be set to be a different range from the range of the detectable area A1, without being limited the example described above.

The image forming apparatus 2 according to an embodiment of the present invention further performs processing of varying the value of the outsider-use-possibility P to be calculated or the threshold value Th thereof, in accordance with various factors (information) included in the print job or the user ID.

For example, it is assumed that the image forming apparatus 2 has determined, on the basis of information of the user ID of the unpermitted user U2 detected by a user detection portion 19, that the unpermitted user U2 is a user belonging to different office in the same company as the output-permitted user U1. The purpose of the unpermitted user U2 approaching the image forming apparatus 2 is assumed to be very likely to use the image forming apparatus 2. Therefore, when the unpermitted user U2 existing around the image forming apparatus 2 is a user belonging to different office, the image forming apparatus 2 according to the present embodiment modifies the value of the outsider-use-possibility P to be calculated to a value higher than the normal value (for example, the value illustrated in FIG. 5: the value in a case where the unpermitted user U2 is a user in the same office as the output-permitted user U1).

Figure 6:
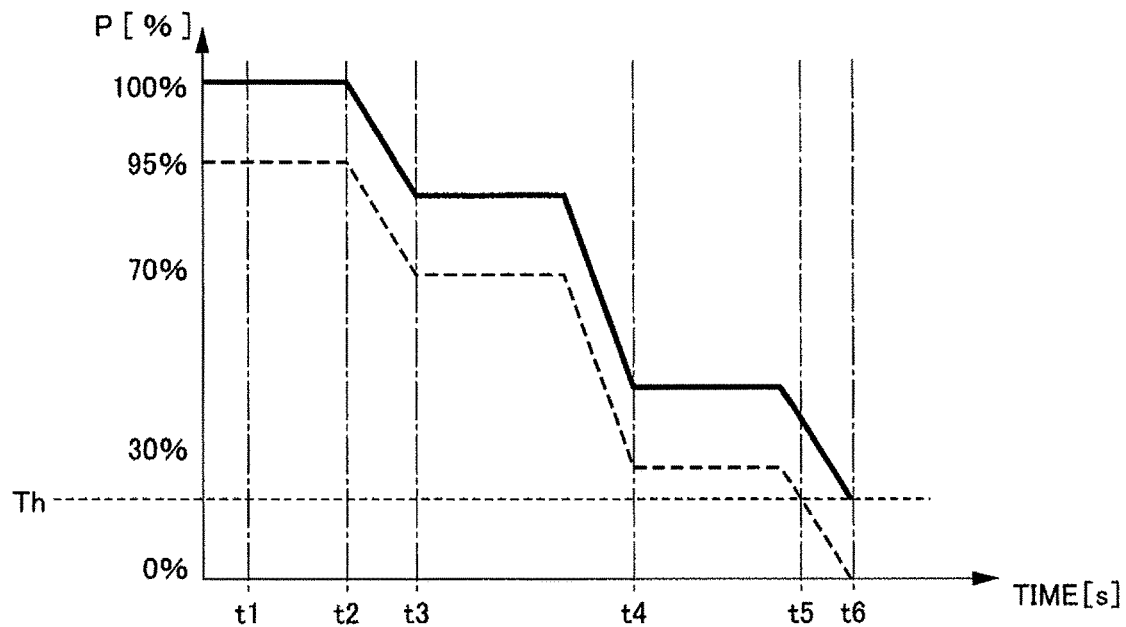
FIG. 6 is an explanatory diagram illustrating an example of modification control of an outsider-use-possibility value according to an embodiment of the present invention.

FIG. 6 illustrates an example in which the value of the outsider-use-possibility P is raised higher than the value that illustrated in FIG. 5, by 5%. In addition, in the example illustrated in FIG. 6, the threshold value Th is set to a fixed value (same value) after having changed the outsider-use-possibility P. Such a control by the image forming apparatus 2 is performed, and thus the timing when the outsider-use-possibility P becomes equal to or smaller than the threshold value Th is set to a time point t6 that is later than the time point t5 that is the start-output timing before changing the outsider-use-possibility P. Namely, the time period before output process is started by the image forming apparatus 2 becomes longer than the case where the unpermitted user U2 existing around the image forming apparatus 2 is a user in the same office.

Furthermore, when, for example, the security level that is set in the security job J1 is high, it is necessary to raise the security of the output product that has been output on the basis of the security job J1. On the other hand, when the security level that is set in the security job J1 is low, there is no problem even when the security of the output product which has been output on the basis of the security job J1 is not very high.

Figure 7:
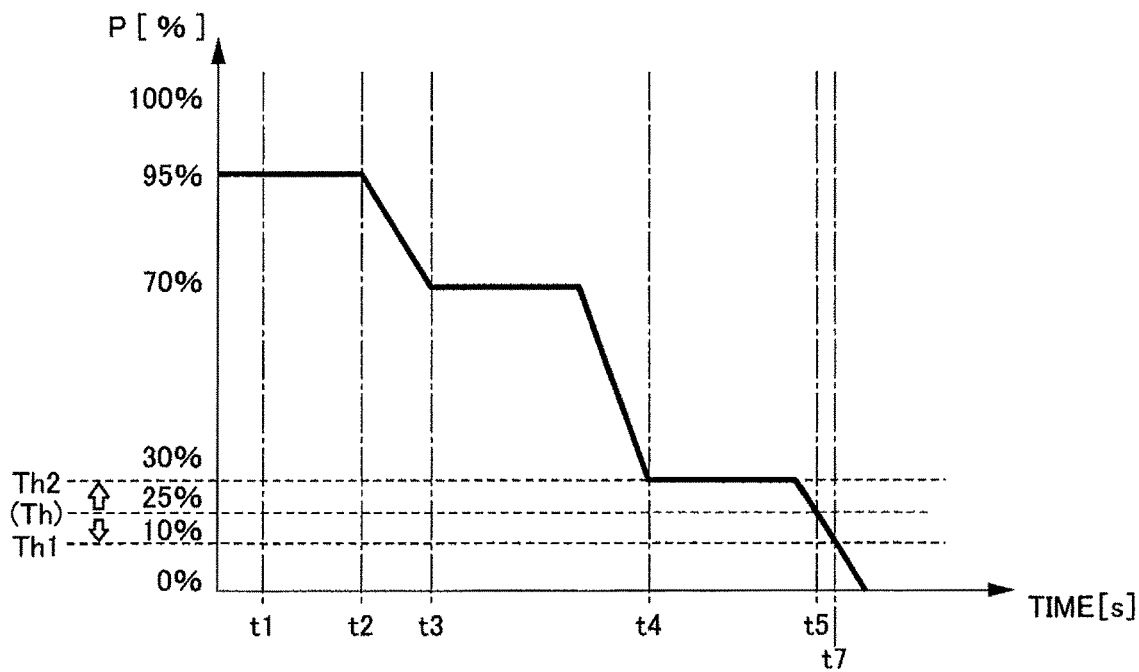
FIG. 7 is an explanatory diagram illustrating an example of change control of the threshold value of outsider-use-possibility according to an embodiment of the present invention.

Therefore, the image forming apparatus 2 according to the present embodiment sets the threshold value Th to a value smaller than the normal setting value (e.g., 25%) in a case where the security that is set in the security job J1 is high. On the other hand, the image forming apparatus 2 sets the threshold value Th to a value higher than the normal setting value in a case where the security that is set in the security job J1 is low. FIG. 7 illustrates an example of modification of the threshold value Th. In the example illustrated in FIG. 7, the threshold value Th is modified to a threshold value Th1 of 10% that is smaller than the normal setting value of 25% in a case where the security that is set in the security job J1 is high. In a case where the security that is set in the security job J1 is low, the threshold value Th is modified to a threshold value Th2 of 30% that is higher than the normal setting value of 25%.

In the case where the image forming apparatus 2 has modified the threshold value Th to the threshold value Th1, the timing when the outsider-use-possibility P becomes equal to or smaller than the threshold value Th becomes a time point t7 which is later than the time point t5. Namely, when the security level of the job set in the security job J1 is a high level, the time before output process is started by the image forming apparatus 2 becomes longer than the case where the security level is an intermediate level (the case where the normal threshold value Th is applied). Accordingly, it becomes possible to further reduce the possibility that the unpermitted user U2 may peek at the output product based on the security job J1, thereby being capable of raising the security of the output product.

In the case where the image forming apparatus 2 has modified the threshold value Th to the threshold value Th2, the timing when the outsider-use-possibility P becomes equal to or smaller than the threshold value Th becomes the time point t4 which is earlier than the time point t5. Namely, when the security of the job set in the security job J1 is a low level, the time before output process is started by the image forming apparatus 2 becomes shorter than the case where the security is an intermediate level (the case where the normal threshold value Th is applied). Accordingly, it becomes possible to further reduce the waiting time until the output-permitted user U1 acquires the output product which has been output on the basis of the security job J1.

In addition, even though the unpermitted user U2 exists around the image forming apparatus 2, the risk of the unpermitted user U2 peeking at the output product which has been output on the basis of the security job J1 becomes lower by reduction of the distance between the output-permitted user U1 and the image forming apparatus 2. Therefore, the image forming apparatus 2 according to the present embodiment also has a function of modifying the threshold value Th of the outsider-use-possibility P in accordance with the user distance L that is the distance between the output-permitted user U1 and the image forming apparatus 2.

Figure 8:
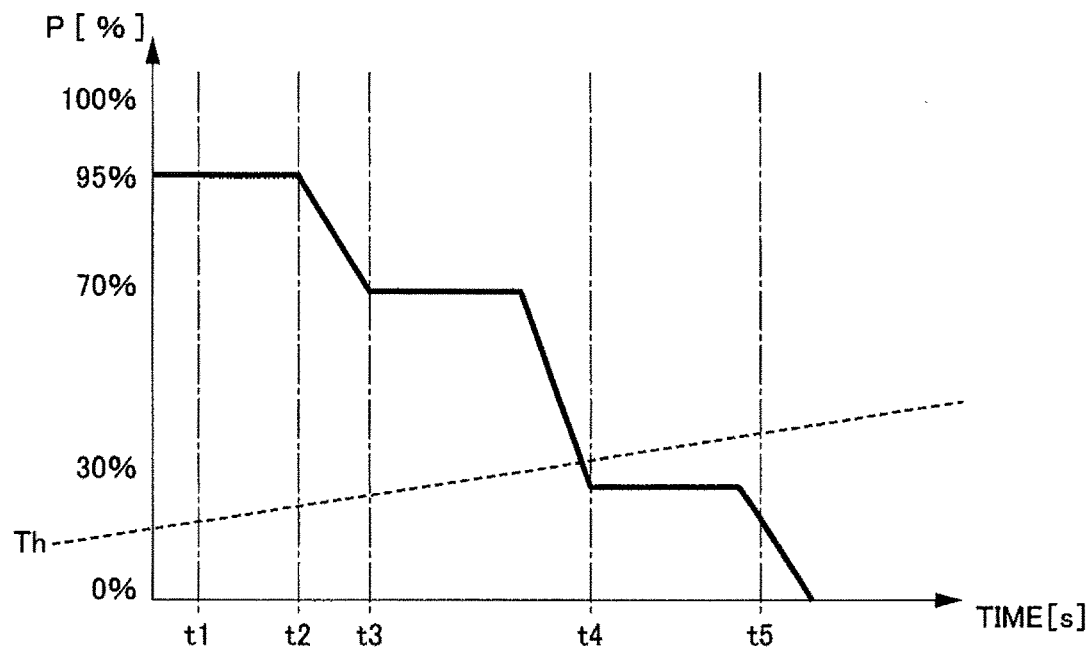
FIG. 8 is an explanatory diagram illustrating an example of changing the threshold value of the outsider-use-possibility in accordance with the distance between the image forming apparatus and the outsider according to an embodiment of the present invention.

FIG. 8 illustrates an example of controlling the threshold value Th by the image forming apparatus 2 so as to gradually increase (refer to the dashed line in FIG. 8) as the user distance L becomes shorter. For example, the image forming apparatus 2 performs a control of modifying the threshold value Th to 30% when the user distance L of the output-permitted user U1 is 3 m, and of modifying the threshold value Th to 40% when the user distance L is 1 m. Such a control by the image forming apparatus 2 is performed, and thus the output process of the image forming apparatus 2 is started when the outsider-use-possibility P has become equal to or smaller than 30%, in a case where the user distance L of the output-permitted user U1 is 3 m. In addition, the output process of the image forming apparatus 2 is started when the outsider-use-possibility P has become equal to or smaller than 40%, in a case where the user distance L of the output-permitted user U1 is 1 m.

Namely, the output process of the image forming apparatus 2 is started even though the outsider-use-possibility P is high when the user distance L of the output-permitted user U1 is small (the distance from the image forming apparatus 2 is small). In the example illustrated in FIG. 8, the outsider-use-possibility P and the threshold value Th take the same value just before the time point t4, and at the timing, the output process by the image forming apparatus 2 is started. Namely, the image forming processing by the image forming apparatus 2 is started earlier than the control example that does not change the threshold value Th (control example in FIG. 5) when the user distance L of the output-permitted user U1 has decreased. Accordingly, it is possible to reduce the waiting time until the output-permitted user U1 acquires the output product which has been output on the basis of the security job J1, while ensuring the security of the output product.

The image forming apparatus 2 according to the present embodiment has a function of varying the value of the outsider-use-possibility P or the threshold value Th depending on a factor other than the factor described above, and details of the function will be described with reference to FIG. 16 below.

<Hardware Configuration of Image Forming Apparatus>

Figure 9:
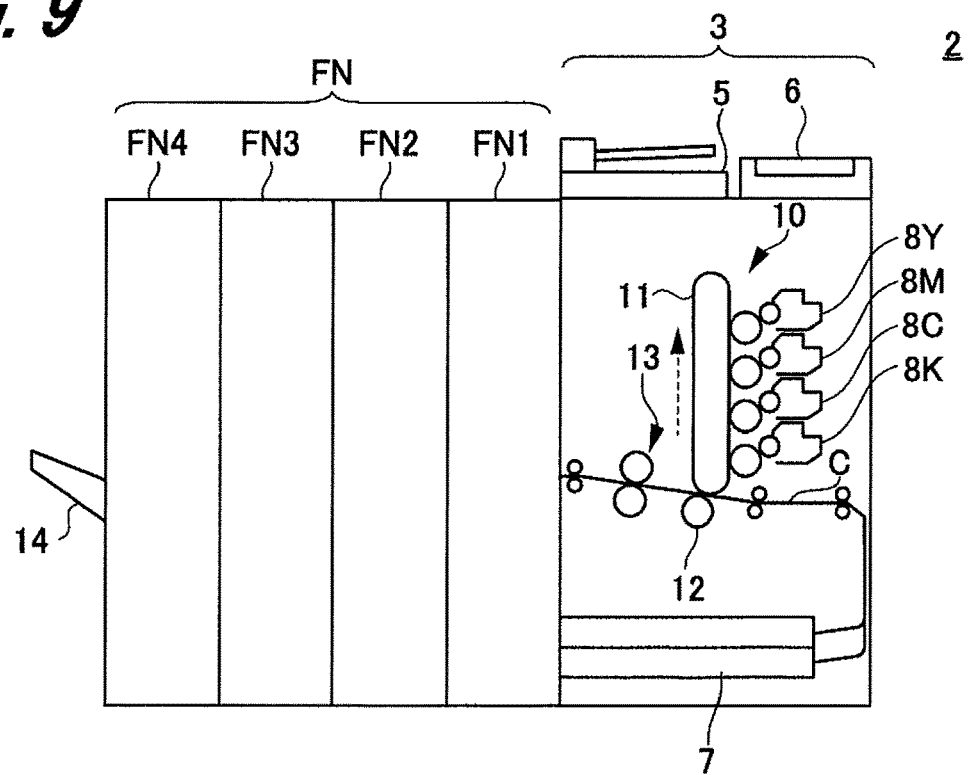
FIG. 9 is hardware configuration diagram of an image forming apparatus according to an embodiment of the present invention.

Next, a specific configuration example of the image forming apparatus 2 according to the present embodiment will be described with reference to FIG. 9. FIG. 9 is a hardware configuration diagram of the image forming apparatus 2.

The image forming apparatus 2 includes the image forming apparatus main body 3 and the post-processing device FN, as illustrated in FIG. 9. The image forming apparatus main body 3 adopts an electrophotographic system that forms an image by the use of static electricity, and is capable of performing a process of forming a color image obtained by superimposing toner images of four colors, for example, a toner image of Y (yellow), a toner image of M (magenta), a toner image of C (cyan), and a toner image of K (black). The image forming apparatus main body 3 has an auto document feeder (ADF) 5, a control panel 6, a sheet feeding portion 7, an image forming portion 10, an intermediate transfer belt 11 (image carrier), a secondary transfer portion 12, and a fixing portion 13.

The auto document feeder 5 automatically feeds a document when reading the document. Then, a scanner 45 (refer to FIG. 10 described below) provided on the auto document feeder 5 can read images on a document placed on an upper platen glass of the image forming apparatus main body 3, or images on a document automatically conveyed by the auto document feeder 5.

The control panel 6 includes, for example, an operation portion 41 (refer to FIG. 10 described below) having a function of instructing the start of a job such as image forming processing. The control panel 6 has an LCD (Liquid Crystal Display) placed thereon. The LCD includes a touch panel, and is capable of displaying operations by the output-permitted user U1 or the unpermitted user U2, and of displaying various information. The LCD serves as both the operation portion 41 and a display portion 42, illustrated in FIG. 10 described below.

The sheet feeding portion 7 includes a plurality of sheet storage portions depending on the size or type of the sheet. When, in the sheet feeding portion 7, a corresponding sheet storage portion is selected on the basis of an instruction from the image forming apparatus main body 3, the sheet feeding portion 7 takes out a sheet from the sheet storage portion and feeds the sheet to a conveyance path C.

The image forming portion 10 includes four image forming units 8Y, 8M, 8C, 8K for forming a toner image of Y, a toner image of M, a toner image of C, and a toner image of K. The image forming portion 10 controls the operation of the image forming units 8Y, 8M, 8C, and 8K of the image forming portion 10 to form a toner image of Y, a toner image of M, a toner image of C, and a toner image of K. In addition, the image forming apparatus main body 3 has a plurality of rollers (conveyance rollers) for conveying sheets to the conveyance path C. The rollers are usually constituted of roller pairs.

The image forming apparatus main body 3, in an image forming mode, electrically charges photoreceptors of the image forming units 8Y, 8M, 8C, and 8K, erases the charges and exposes the photoreceptors to thereby form electrostatic latent images on the photoreceptors. Then, the image forming apparatus main body 3 uses a development portion to adhere the toner to the electrostatic latent images on the Y, M, C, and K photoreceptors, thereby forming toner images of respective colors. Subsequently, the toner images formed on the Y, M, C, and K photoreceptors are primarily transferred sequentially on a surface of the intermediate transfer belt 11 rotating in a direction indicated by the dashed-line arrow.

Next, the toner images of respective colors primarily transferred onto the intermediate transfer belt 11 are secondarily transferred, by the secondary transfer portion 12 (secondary transfer roller), to a sheet fed from the sheet feeding portion 7 and conveyed by the roller. A color image is formed by performing the secondary transfer of the respective color toner images on the intermediate transfer belt 11 onto the sheet. The image forming apparatus main body 3 conveys, to the fixing portion 13, the sheet having the color toner image formed thereon.

The fixing portion 13 is a device that performs fixing processing on the sheet having the color toner image formed thereon. The fixing portion 13 applies pressure and heat on the conveyed Sheet, and fixes the transferred toner image on the sheet. The fixing portion 13 includes, for example, a fixing upper roller and a fixing lower roller (not illustrated) which are fixing members. The fixing upper roller and the fixing lower roller are arranged in a mutual pressure-contact state, and a fixing nip portion is formed as a pressure-contact portion between the fixing upper roller and the fixing lower roller.

A heating portion, not illustrated, is provided inside the fixing upper roller. Radiant heat from the heating portion heats a roller portion located on the outer peripheral portion of the fixing upper roller. The sheet is conveyed to the fixing nip portion so that the surface having the toner image transferred thereon by the secondary transfer portion 12 (fixing target surface) faces the fixing upper roller. The sheet passing through the fixing nip portion is subjected to pressurization by the fixing upper roller and the fixing lower roller and to heating by the heat of the roller portion of the fixing upper roller. The sheet subjected to fixing processing by the fixing portion 13 is ejected to the post-processing device FN.

The post-processing device FN includes, for example, a sheet folding device FN1, a cutting device FN2, a staple device FN3, and a bookbinding device FN4.

The sheet folding device FN1 performs, as necessary, sheet-folding processing on a sheet conveyed from the image forming apparatus main body 3, and ejects the sheet to the subsequent cutting device FN2. Specifically, when execution of the sheet-folding processing is set in the print job, the sheet folding device FN1 performs sheet-folding processing on the sheet, and then ejects the sheet to the cutting device FN2. On the other hand, when execution of the sheet-folding processing is not set in the print job, the sheet folding device FN1 directly ejects the sheet to the cutting device FN2 without performing the sheet-folding processing on the sheet.

The cutting device FN2 performs, as necessary, cutting processing on a sheet conveyed from the sheet folding device FN1, and ejects the sheet to the subsequent staple device FN3. Specifically, when execution of the cutting processing is set in the print job, the cutting device FN2 performs the cutting processing on the sheet, and then ejects the sheet to the staple device FN3. On the other hand, when execution of the cutting processing is not set in the print job, the cutting device FN2 directly ejects the sheet to the staple device FN3 without performing the cutting processing on the sheet.

The staple device FN3 performs, as necessary, stapling processing on a sheet conveyed from the cutting device FN2, and ejects the sheet to the subsequent bookbinding device FN4. Specifically, when execution of the stapling processing is set in the print job, the staple device FN3 performs the stapling processing on the sheet, and then ejects the sheet to the bookbinding device FN4. On the other hand, when execution of the stapling processing is not set in the print job, the staple device FN3 directly ejects the sheet to the bookbinding device FN4 without performing the stapling processing on the sheet.

The bookbinding device FN4 performs, as necessary, binding processing on a sheet conveyed from the staple device FN3, and ejects the sheet to the sheet receiving tray 14. Specifically, when execution of the bookbinding processing is set in the print job, the bookbinding device FN4 performs the bookbinding processing on the sheet, and then ejects the sheet to the sheet receiving tray 14. On the other hand, when execution of the bookbinding processing is not set in the print job, the bookbinding device FN4 directly ejects the sheet to the sheet receiving tray 14 without performing the bookbinding processing on the sheet. Note that, although the example illustrated in FIG. 9 describes the image forming apparatus 2 that forms color images, an image forming apparatus that forms monochromatic images may be used.

<Schematic Configuration Example of Image Forming Apparatus Main Body>

Figure 10:
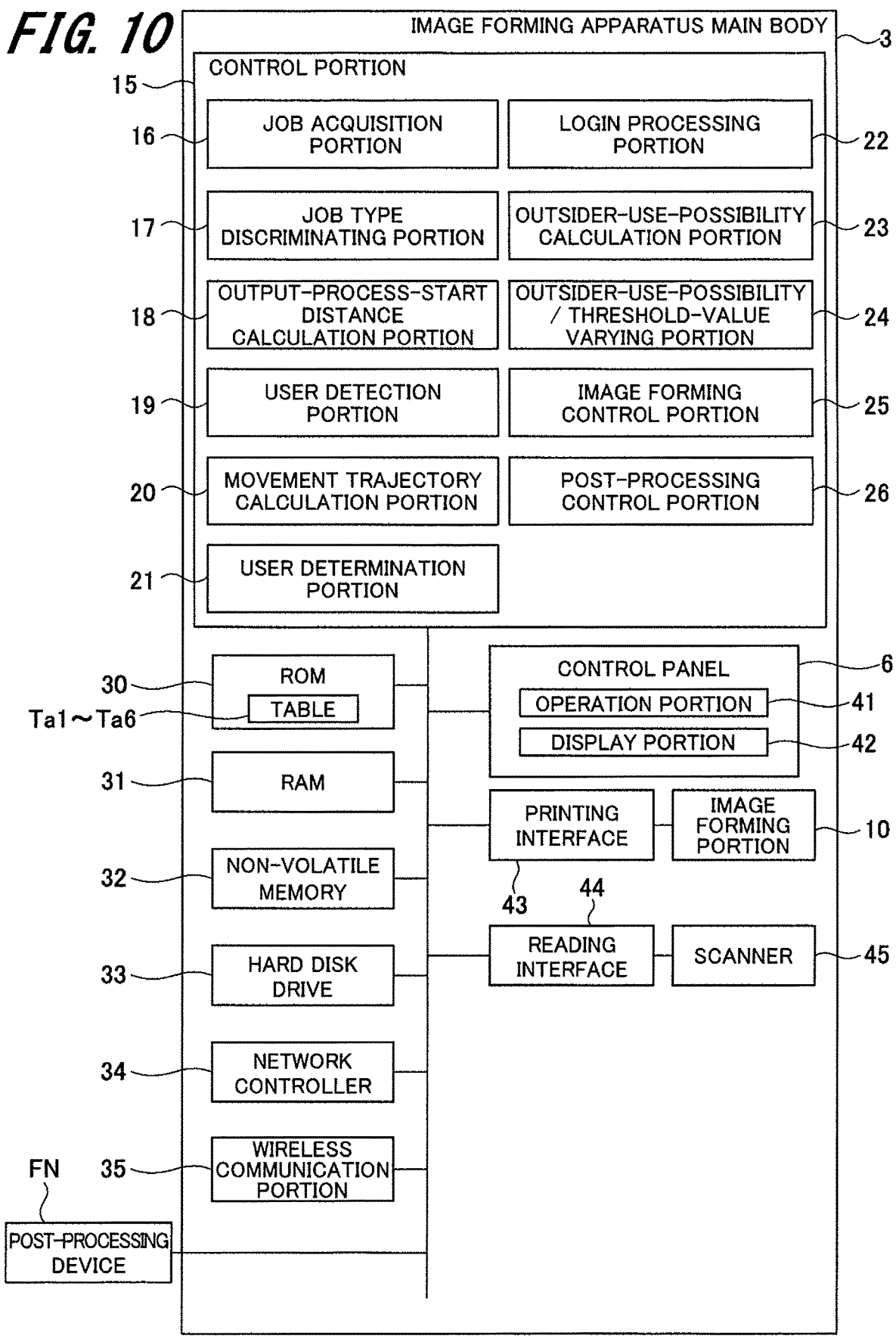
FIG. 10 is a block diagram illustrating an internal configuration of the main body of the image forming apparatus according to an embodiment of the present invention.

Next, a schematic configuration example of the image forming apparatus main body 3 will be described with reference to FIG. 10. FIG. 10 is a block diagram illustrating the schematic configuration of the image forming apparatus main body 3.

The image forming apparatus main body 3 is a so-called Multi-Function Printer (MFP) including functions such as a copying function, a scanning function, a printing function, or the like. The copying function is a function of optically reading a document, and printing a reproduced image thereof on a sheet. The scanning function is a function of saving the image data of the read document in a file or transmitting the image data to the PC terminals P1 and P2 via the network N. The printing function is a function of printing and outputting documents or images on sheets on the basis of print jobs received from external devices such as the PC terminals P1 and P2 via the network N.

The image forming apparatus main body 3 includes a control portion 15 that collectively controls the operation of the image forming apparatus main body 3. The control portion 15 includes a CPU (Central Processing Unit) or the like, controls respective portions constituting the image forming apparatus main body 3, and executes processing. The control portion 15 has a ROM (Read Only Memory) 30, a RAM (Random Access Memory) 31, a non-volatile memory 32, a hard disk drive 33, a network controller 34, a wireless communication portion 35, the control panel 6, a printing interface 43, a reading interface 44, and the like, connected thereto via a bus. The printing interface 43 has the image forming portion 10 connected thereto. The reading interface 44 has the scanner 45 connected thereto.

The control portion 15 is based on an OS (Operating System) program, and executes programs such as middleware, application programs, or the like. The processing in the respective portions performed by the control portion 15 will be described below.

The ROM 30 stores various programs therein, and respective functions of the image forming apparatus main body 3 are realized by performing processes by the control portion 15 according to the programs. In addition, the ROM 30 stores a number-of-sheets-in-job/distance conversion table Ta1 illustrated in FIG. 11, a job type/distance conversion table Ta2 illustrated in FIG. 12, and a radio wave strength/distance conversion table Ta3 corresponding to the characteristic diagram illustrated in FIG. 14. Furthermore, the ROM 30 stores an outsider-use-possibility table Ta4 illustrated in FIG. 15, a threshold value variation factor table Ta5 illustrated in FIG. 16, and a the threshold value modification table Ta6 illustrated in FIG. 17. Moreover, the ROM 30 stores therein user IDs, passwords, or the like, which allow the output-permitted user U1 or the unpermitted user U2 to login to the image forming apparatus 2.

The RAM 31 is used as a work memory for temporarily storing various data when the control portion 15 executes a program. In addition, the RAM 31 temporarily stores a print job acquired by a job acquisition portion 16 described below, in the control portion 15. The non-volatile memory 32 stores various settings. The hard disk drive 33 stores print jobs or the like received by the network controller 34.

The network controller 34 receives print jobs from the PC terminals P1 and P2 via the network N, by control of a job acquisition portion 16 described below. The wireless communication portion 35 performs bi-directional communication with the terminal device 4 via short-distance wireless communication using Bluetooth (registered trademark), WiFi (registered trademark), or the like. Furthermore, the wireless communication portion 35 measures the strength of the radio wave (received signal strength) on which the terminal device 4 transmits user IDs. Information of the radio wave strength of the terminal device 4 measured by the wireless communication portion 35 is output to the user detection portion 19 described below, in the control portion 15.

The control panel 6 includes the operation portion 41 and the display portion 42. The operation portion 41 is constituted of various operation switches such as a start button, a touch panel or the like provided on the display screen of the display portion 42, or the like. Namely, the operation portion 41 is constituted integrally with the display portion 42 at the portion of the touch panel. The touch panel detects the coordinate position pressed down with a touch pen or a finger. In addition, the touch panel detects flick operations, drag operations, operations on the scroll bar, or the like. The display portion 42 is constituted of a liquid crystal display (LCD), and displays various operation screens, setting screens, or the like. Note that the operation portion 41 can be constituted by a mouse, a tablet, or the like, and can also be constituted as a separate body from the display portion 42.

The image forming portion 10 connected to the control portion 15 via the printing interface 43 performs image forming processing that forms an image on a sheet on the basis of a print job acquired by the job acquisition portion 16 described below, by control of an image forming control portion 25.

The scanner 45 connected to the control portion 15 via the reading interface 44 optically reads a document to thereby acquire image data. The scanner 45 includes, for example, a line image sensor, a mobile unit, an optical path, a conversion portion, or the like. The line image sensor has a light source that irradiates a document with light, and receives light reflected from the document and reads information for a single line in the width direction of the document. The mobile unit sequentially moves the line-by-line read position in the length direction of the document. The optical path includes a lens or a mirror which guides the reflected light from the document to a line image sensor and which forms an image thereon. The conversion portion converts analog image signals output from the line image sensor into digital image data.

Subsequently, a configuration example of respective portions included in the control portion 15 will be described. The control portion 15 includes the job acquisition portion 16, a job type discrimination portion 17, an output-process-start distance calculation portion 18, the user detection portion 19, a movement trajectory calculation portion 20, a user determination portion 21, and a login processing portion 22. In addition, the control portion 15 includes the outsider-use-possibility calculation portion 23, an outsider-use possibility/threshold-value varying portion 24, the image forming control portion 25, and a post-processing control portion 26.

The job acquisition portion 16 controls the network controller 34 to thereby acquire print jobs transmitted from the PC terminal P1 and P2, via the network N.

The job type discrimination portion 17 discriminates the job type set in the print job acquired by the job acquisition portion 16. The job type includes, for example, the type of post-processing (sheet folding, cutting, stapling, and bookbinding) to be performed on a sheet having an image formed thereon.

The output-process-start distance calculation portion 18 calculates the output-process-start distance D2 on the basis of the job type/discriminated by the job type discrimination portion 17. When the output-process-start distance calculation portion 18 calculates the output-process-start distance D2, the portion 18 refers to the number-of-sheets-in-job/distance conversion table Ta1 and/or the job type/distance conversion table Ta2, stored in the ROM 30. The output-process-start distance calculation portion 18 stores the calculated output-process-start distance D2, in the RAM 31.

FIG. 11 illustrates a configuration diagram of the number-of-sheets-in-job/distance conversion table Ta1. As illustrated in FIG. 11, the number-of-sheets-in-job/distance conversion table Ta1 has a field for the number-of-sheets-in-job and a field for the output-process-start distance D2. The number-of-sheets-in-job/distance conversion table Ta1 manages the number-of-sheets-in-job set in the print job and the output-process-start distance D2 in association with each other. The number-of-sheets-in-job is the number of sheets on which images are formed by the image forming portion 10. Note that the number-of-sheets-in-job is one when images are formed on only one side of the sheet and the number is two when images are formed on both sides of the sheet.

The output-process-start distance calculation portion 18 determines the output-process-start distance D2 from the number-of-sheets-in-job/distance conversion table Ta1 on the basis of the number-of-sheets-in-job included in the print job. For example, the output-process-start distance calculation portion 18 determines the output-process-start distance D2 to be "0.5 m" when the number-of-sheets-in-job in the print job is "one". In addition, the output-process-start distance calculation portion 18 determines the output-process-start distance D2 to be "1 m" when the number-of-sheets-in-job of the print job is "two". The reason for increasing the output-process-start distance D2 for a larger number of sheets in the job is that the larger the number-of-sheets-in-job is, the longer the time from the start to the end of the image forming processing becomes.

FIG. 12 illustrates a configuration diagram of the job type/distance conversion table Ta2. The job type/distance conversion table Ta2 illustrated in FIG. 12 manages the relation between the job type set in the print job and the output-process-start distance D2 in association with each other. The job type/distance conversion table Ta2 has a field for the management number which is a number for managing the post-processing performed by the post-processing device FN in an identifiable manner, a field for the job type indicating the type of post-processing to be performed in the post-processing device FN, and field for the output-process-start distance. The output-process-start distance in the job type/distance conversion table Ta2 is set to the shortest output-process-start distance to be used by the output-process-start distance calculation portion 18 so as not to impair the security.

In the example illustrated in FIG. 12, the top record in job type/distance conversion table Ta2 indicates that the type of the job to be executed by the sheet folding device FN1 corresponding to a management number "FN1" is a "sheet folding" process and that the output-process-start distance D2 is "2 m". In addition, the second record from the top indicates that the type of the job to be executed by the cutting device FN2 corresponding to a management number "FN2" is a "cutting" process and that the output-process-start distance D2 is "1 m". Additionally, the third record from the top indicates that the type of the job to be executed by the staple device FN3 corresponding to a management number "FN3" is a "stapling" process and that the output-process-start distance D2 is "0.5 m". Furthermore, the fourth record from the top indicates that the type of the job to be executed by the bookbinding device FN4 corresponding to a management number "FN4" is a "bookbinding" process and that the output-process-start distance D2 is "3 m".

In addition, the output-process-start distance calculation portion 18 calculates the sum of output-process-start distances of respective job types acquired from the job type/distance conversion table Ta2 in a case where the security job J1 includes a plurality of job types; and sets the summed value as the output-process-start distance D2.

FIG. 13 illustrates examples of job type combination. When, for example, the job types set in the print job are "cutting" and "stapling", the summed value of respective output-process-start distances set in the two job types becomes "1.5 m". In addition, when the job types set in the print job are, for example, "sheet folding", "cutting", "stapling" and "bookbinding", the summed value of output-process-start distance set in the job types becomes "6.5 m".

Note that, in a case where no post-processing (job type) is set in the print job, the output-process-start distance calculation portion 18 determines the output-process-start distance D2, on the basis of information of the time until the first sheet on the sheet receiving tray 14 is ejected (the time from the start of the image forming processing to the time when the output product is ejected on the sheet receiving tray 14). Here, the output-process-start distance calculation portion 18 may set, as the output-process-start distance D2, a summed distance that is calculated by summing the output-process-start distance D2 determined from the number-of-sheets-in-job/distance conversion table Ta1 and the output-process-start distance D2 determined from the job type/distance conversion table Ta2.

The user detection portion 19 detects the terminal device 4 held by a user existing in the detectable area A1, via short-distance wireless communication performed between the wireless communication portion 35 and the terminal device 4. When the user detection portion 19 detects the terminal device 4, the user detection portion 19 calculates the user distance L with reference to the radio wave strength/distance conversion table Ta3 (not illustrated) stored in the ROM 30, on the basis of the received signal strength of the radio wave transmitted by the terminal device 4 and measured by the wireless communication portion 35.

Figure 14:
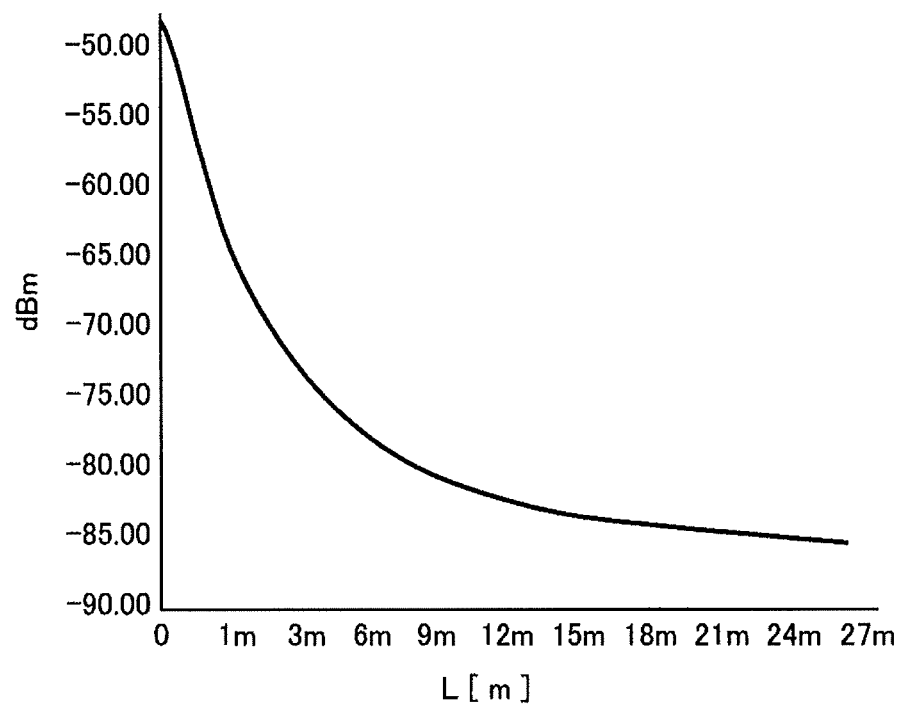
FIG. 14 is a characteristic diagram illustrating a relation between the user distance and the radio wave strength of a terminal device carried by a user according to an embodiment of the present invention.

FIG. 14 illustrates characteristic diagram indicating the relation between the user distance L and the radio wave strength (received signal strength). The vertical axis in FIG. 14 indicates the radio wave strength (dBm) and the horizontal axis indicates the user distance L (m). As illustrated in FIG. 14, the longer the user distance L is, the weaker the radio wave strength of the radio wave received by the wireless communication portion 35 from the terminal device 4 becomes, and the radio wave strength becomes stronger as the user distance L becomes shorter. The relation between the user distance L and the radio wave strength indicated in the characteristic diagram illustrated in FIG. 14 is defined in the radio wave strength/distance conversion table Ta3, and is stored in the ROM 30.

When the user detection portion 19 acquires the information of the radio wave strength of the received radio wave from the wireless communication portion 35, the user detection portion 19 converts the radio wave strength into the user distance L, with reference to the radio wave strength/distance conversion table Ta3 stored in the ROM 30. Accordingly, the user detection portion 19 can obtain the user distance L from the image forming apparatus 2 (target apparatus) to a user (the output-permitted user U1 or the unpermitted user U2).

In addition, the user detection portion 19 also functions as an outsider detection portion that detects the unpermitted user U2 existing in the outsider detection area A3 and calculates the user distance L of the unpermitted user U2 who has been detected. Detection of the unpermitted user U2 existing in the outsider detection area A3 can be performed by a technique similar to the calculation of the user distance L described above. Note that detection of the unpermitted user U2 who is not holding the terminal device 4 can be performed, for example, by analysis of information included in images captured by a camera attached to the image forming apparatus 2, or provided around the image forming apparatus 2.

Note that the technique of calculating the user distance L by the user detection portion 19 is not limited to the technique of obtaining the received signal strength of the radio wave and converting the received signal strength to the user distance L. For example, the user detection portion 19 may detect an absolute position such as the orientation of the user relative to the image forming apparatus 2 and latitude and longitude, by the use of the GPS (Global Positioning System) or the like, and may set the detected absolute position as the user distance L.

The movement trajectory calculation portion 20 regularly performs sampling of positions of the unpermitted user U2 detected in the outsider detection area A3 and calculates the movement trajectory of the unpermitted user U2 by the use of the information of a plurality of positions obtained by the sampling. Calculation of a movement trajectory of the unpermitted user U2 is performed on the basis of, for example, information of the orientation of the unpermitted user U2 detected by the user detection portion 19 relative to the image forming apparatus 2, and the user distance L of the unpermitted user U2 calculated by the user detection portion 19.

The calculation process of the movement trajectory by the movement trajectory calculation portion 20 is continuously performed for all of the unpermitted users U2 detected in the outsider detection area A3, while the unpermitted users U2 are being detected in the outsider detection area A3, regardless of the information indicating whether or not the output-permitted user U1 has been detected by the user detection portion 19. Then, the movement trajectory calculation portion 20 stores the information of the movement trajectory calculated for each of the unpermitted users U2 in the RAM 31.

The user determination portion 21 determines whether or not the user detected in the detectable area A1 by the user detection portion 19 is the output-permitted user U1 who has issued the security job J1. Specifically, the user determination portion 21 acquires the user ID received by the wireless communication portion 35 from the terminal device 4 and determines whether or not the detected user is the output-permitted user U1, on the basis of the acquired user ID.

The login processing portion 22 (an example of the authentication portion) performs login authentication of the output-permitted user U1 determined by the user determination portion 21. At this time, the login processing portion 22 performs login authentication of the output-permitted user U1 by remote login, on the basis of the user ID of the output-permitted user U1 who has entered the detectable area A1.

Additionally, in a case where a user ID and a password are input to the control panel 6, the login processing portion 22 performs login authentication of the user by collating the user ID and the password, and the user ID and the password stored in the ROM 30. In addition, the login processing portion 22 performs login authentication by the use of the user ID in a case where the user ID is received from an IC card or the like including an RFID (Radio Frequency Identification) having user information registered therein. Additionally, in a case where the user determination portion 21 has determined that the user in the detectable area A1 is the unpermitted user U2, the login processing portion 22 may perform login authentication of the unpermitted user U2 on the basis of the user ID transmitted from the terminal device 4 held by the unpermitted user U2 to the wireless communication portion 35.

The outsider-use-possibility calculation portion 23 calculates the outsider-use-possibility P, on the basis of information of the movement trajectory of the unpermitted user U2 calculated by the movement trajectory calculation portion 20. Calculation of the outsider-use-possibility P is performed by the outsider-use-possibility calculation portion 23 with reference to the outsider-use-possibility table Ta4. FIG. 15 illustrates an example of configuration of the outsider-use-possibility table Ta4. The table illustrated in FIG. 15A is an outsider-use-possibility table Ta4_1 associating the movement direction of the unpermitted user U2 (movement direction of outsider) with the outsider-use-possibility P. The table illustrated in FIG. 15B is an outsider-use-possibility table Ta4_2 associating the combination of the movement direction of outsider and the user distance L with the outsider-use-possibility P.

In the outsider-use-possibility table Ta4_1 illustrated in FIG. 15A, an outsider-use-possibility "95%" is associated with a movement direction of outsider "approaching direction", and an outsider-use-possibility "70%" is associated with a movement direction of outsider "crossing direction". In addition, an outsider-use-possibility "50%" is associated with a movement direction of outsider "no movement", and an outsider-use-possibility "30%" is associated with a movement direction of outsider "leaving direction". Furthermore, an outsider-use-possibility "10%" is associated with a movement direction of outsider "further leaving direction".

In a case where the outsider-use-possibility table Ta4_1 is used, the outsider-use-possibility calculation portion 23 calculates the outsider-use-possibility P to be 95% when the movement direction of the unpermitted user U2 detected by the user detection portion 19 is, for example, "approaching direction". In addition, the outsider-use-possibility calculation portion 23 calculates the outsider-use-possibility P to be 70% when the movement direction of the unpermitted user U2 is, for example, "crossing direction" and calculates the outsider-use-possibility P to be 50% when the movement direction of the unpermitted user U2 is, for example, "no movement". Furthermore, the outsider-use-possibility calculation portion 23 calculates the outsider-use-possibility P to be 30% when the movement direction of the unpermitted user U2 is, for example, "leaving direction", and calculates the outsider-use-possibility P to be 10% when the movement direction of the unpermitted user U2 is, for example, "further leaving direction".

In a case where the unpermitted user U2 has moved along, for example, the movement trajectory illustrated in FIG. 4, the movement direction of the unpermitted user U2 is determined by the user detection portion 19 to be "approaching direction" when the unpermitted user U2 existed at the position U2_t1 and the position U2_t2. Therefore, the outsider-use-possibility calculation portion 23 calculates the outsider-use-possibility P to be 95% at the time points. At this time, it is assumed that the threshold value Th of the outsider-use-possibility P is set to 25% as with the example illustrated in FIG. 5, the outsider-use-possibility P is larger than the threshold value Th and thus output process by the image forming apparatus 2 is not started.

The movement direction of the unpermitted user U2 is determined to be "crossing direction" by the user detection portion 19 when the unpermitted user U2 existed at the position U2_t3. Therefore, the outsider-use-possibility calculation portion 23 calculates the outsider-use-possibility P to be 70%. However, the outsider-use-possibility P is still larger than the threshold value Th (25%) at the time point, and thus the output process by the image forming apparatus 2 is not started.

The movement direction of the unpermitted user U2 is determined to be "leaving direction" by the user detection portion 19 when the unpermitted user U2 is positioned at the position U2_t4. Therefore, the outsider-use-possibility calculation portion 23 calculates the outsider-use-possibility P to be 30% at the time point. However, the outsider-use-possibility P is still larger than the threshold value Th (25%) at the time point, the output process by the image forming apparatus 2 is not started.

The movement direction of the unpermitted user U2 is determined by the user detection portion 19 to be "further leaving direction" at the time when the unpermitted user U2 existed at the position U2_t5. Therefore, the outsider-use-possibility calculation portion 23 calculates the outsider-use-possibility P to be 10% at the time point. The outsider-use-possibility P is less than the threshold value Th (25%). Accordingly, in a case where the outsider-use-possibility table Ta4_1 is used, the output process by the image forming apparatus 2 is started at the time point t5 when the outsider-use-possibility P has become less than the threshold value Th, with the threshold value Th being 25%.

In the outsider-use-possibility table Ta4_2 illustrated in FIG. 15B, the combination of the movement direction of outsider and the user distance is associated with the outsider-use-possibility P, and a larger value is assigned as a value of an outsider-use-possibility P as the user distance L of the unpermitted user U2 becomes shorter. In the, for example, movement direction of outsider "approaching direction", the outsider-use-possibility P "95%" is assigned when the user distance L is "5 m", the outsider-use-possibility P "100%" is assigned when the user distance L is "3 m", and the outsider-use-possibility P "100%" is assigned when the user distance L is "1 m". In addition, in the movement direction of outsider "crossing direction", the outsider-use-possibility P "70%" is assigned when the user distance L is "5 m", the outsider-use-possibility P "80%" is assigned when the user distance L is "3 m", and the outsider-use-possibility P "100%" is assigned when the user distance L is "1 m". Namely, a high value is calculated for the outsider-use-possibility P when the user distance L of the unpermitted user U2 is small, i.e., a when the distance between the unpermitted user U2 and the image forming apparatus 2 is close, also in a case where the movement direction of the unpermitted user U2 is the same.

The outsider-use-possibility/threshold-value varying portion 24 performs a process of varying the outsider-use-possibility P or the threshold value Th thereof, on the basis of various factors and elements thereof that vary the outsider-use-possibility P or the threshold value Th thereof. The varying process of the threshold value Th by the outsider-use-possibility/threshold-value varying portion 24 is performed with reference to tables such as the threshold value variation factor table Ta5 associating many factors and elements thereof that vary the threshold value Th with threshold value variation coefficients for modifying the threshold value Th, and the threshold value modification table Ta6 associating the user distance L with the threshold value Th of the outsider-use-possibility P. In addition, the varying process of the outsider-use-possibility P by the outsider-use-possibility/threshold-value varying portion 24 is performed with reference to an unillustrated outsider-use-possibility modification table associating the movement direction of the unpermitted user U2 with the outsider-use-possibility variation coefficient for varying the outsider-use-possibility P.

Hereinafter, exemplary configurations of the threshold value variation factor table Ta5 and the threshold value modification table Ta6 will be described with reference to FIGS. 16 and 17. FIG. 16 illustrates an example of configuration of the threshold value variation factor table Ta5, and FIG. 17 illustrates an example of configuration of the threshold value modification table Ta6.

The threshold value variation factor table Ta5 illustrated in FIG. 16 has a factor field, an element field, and a threshold value variation coefficient field. The factor field has stored therein information of factors that have to vary the threshold value, and the element field has stored therein information of respective elements included in the factors described. Information of factors and elements that have to vary the threshold value is included in information of the security job J1, the owner ID of the output-permitted user U1 described in the security job J1, the user ID of the unpermitted user U2 detected by the user detection portion 19, or the like.

The factor field of the threshold value variation factor table Ta5 has stored therein respective items of, specifically, "security level", "time zone", "schedule", "assignment", "content", and "trust relationship". "Security level" indicates the security that is set in the security job J1, and "time zone" indicates the time when the security job J1 has been issued. In addition, "schedule" indicates the schedule of the unpermitted user U2, and "assignment" indicates the assignment of the output-permitted user U1. Furthermore, "content" indicates the content of the output product which has been output by the security job J1, and "trust relationship" indicates the trust relationship between the output-permitted user U1 and the unpermitted user U2.

The element field has stored therein information of respective elements constituting the factors described above. When, for example, the factor is "security level", a parameter indicating whether the security level of the security job J1 is high or low is stored as an element. The threshold value variation coefficient field has stored therein a threshold value variation coefficient associated with each element.

For example, "−20%" is set as the threshold value variation coefficient for an element "high" of a factor "security level", and a threshold value variation coefficient "0%" is set for an element "low" of a factor "security level". According to the setting, the outsider-use-possibility/threshold-value varying portion 24 performs a process of reducing the threshold value Th of the outsider-use-possibility P by 20% when the security level that is set in the security job J1 is high. When, on the other hand, the security level that is set in the security job J1 is low, the outsider-use-possibility/threshold-value varying portion 24 does not modify the value of the threshold value Th.

For example, a threshold value variation coefficient "−20%" is set for a factor "time zone" and an element "morning". In the morning time zone, it becomes very likely that the output-permitted user U1 performs printing on the basis of the security job J1 by the use of the image forming apparatus 2 at the start of work. Therefore, the image forming apparatus 2 according to the present embodiment performs a process of reducing the threshold value Th of the outsider-use-possibility P by 20% in a case where the time when the security job J1 is issued is morning. In such a case, the output process of the printed matter on the basis of the security job J1 is not started unless the outsider-use-possibility P has become smaller than the time when the unmodified threshold value Th is used.

In addition, the threshold value variation coefficient is set to "−30%" for an element "before meeting" of the factor "schedule", and the threshold value variation coefficient is set to "0%" for an element "after meeting". Information relating to the schedule of the unpermitted user U2 is acquired by reference by the outsider-use-possibility/threshold-value varying portion 24 to the schedule information of the unpermitted user U2 managed by the use of the user ID of the unpermitted user U2. Therefore, the outsider-use-possibility/threshold-value varying portion 24 performs a process of reducing the threshold value Th of the outsider-use-possibility P by 30%, when it is determined, by the acquired information of the schedule of the unpermitted user U2, that the current time point is a time point before holding a meeting in which the unpermitted user U2 is supposed to participate.

In addition, the threshold value variation coefficient is set to "10%" for an element "company staff (same department)" of the factor "trust relationship", and the threshold value variation coefficient is set to "0%" for an element "company staff (different department)". The threshold value variation coefficient is set to "−20%" for an element "company staff (different office)", and the threshold value variation coefficient is set to "20%" for an element "person outside company".

For example, in a case where the unpermitted user U2 is a person belonging to a different office, he or she is assumed to make a business visit to the office to which the output-permitted user U1 belongs. In such case, it is very likely that the reason why the unpermitted user U2 approaches the image forming apparatus 2 is acquisition of a printed matter. In such case, the outsider-use-possibility/threshold-value varying portion 24 may apply a threshold value variation coefficient "−20%" to thereby reduce the threshold value Th of the outsider-use-possibility P, with the result that the time until the outsider-use-possibility P becomes equal to or smaller than the threshold value Th becomes longer. Namely, the timing at which the image forming portion 10 starts output process becomes late and thus it is possible to increase the time during which the output product that has been output on the basis of the security job J1 is protected from the eyes of the unpermitted user U2.

On the other hand, when the unpermitted user U2 is a person belonging to the same department as the output-permitted user U1, it is assumed that the security of the output product based on the security job J1 issued by the output-permitted user U1 may not be very high. In such a case, the outsider-use-possibility/threshold-value varying portion 24 may apply a threshold value variation coefficient "20%" to thereby raise the threshold value Th of the outsider-use-possibility P, with the result that the time until the outsider-use-possibility P becomes equal to or smaller than the threshold value Th becomes shorter. Namely, the timing at which the image forming portion 10 starts output process is accelerated and thus it is possible to make shorter the time until the output-permitted user U1 retrieves the output product.

Note that there may be a case where a plurality of factors that varies the threshold value Th of the outsider-use-possibility P is included in a single security job J1. For example, in a case where the output-permitted user U1 assigned to a clerical work is in charge of handling personnel documents, values "0%" and "−30%" are extracted as threshold value variation coefficients. In such a case, the outsider-use-possibility/threshold-value varying portion 24 uses the threshold value variation coefficient of the lowest value as the threshold value Th. Note that the outsider-use-possibility/threshold-value varying portion 24 may use a value resulted from summing a plurality of threshold value variation coefficients to thereby vary the threshold value.

The threshold value modification table Ta6 illustrated in FIG. 17 has a user distance field storing the user distance L of the output-permitted user U1 and a threshold value field storing the threshold value Th of the outsider-use-possibility P. In the threshold value modification table Ta6, the threshold value Th "0%" is associated with the user distance L "5 m" of the output-permitted user U1, and the threshold value Th "10%" is associated with the user distance L "4 m" of the output-permitted user U1. Then, the threshold value Th "80%" is associated with the user distance L "0.5 m" of the output-permitted user U1. As described above, in the threshold value modification table Ta6, the threshold value Th is set to a larger value as the user distance L of the output-permitted user U1 becomes shorter.

When the outsider-use-possibility/threshold-value varying portion 24 varies the threshold value Th of the outsider-use-possibility P using the threshold value modification table Ta6 of the configuration described above, the output process based on the security job J1 is immediately started even though the outsider-use-possibility P is high, when the user distance L of the unpermitted user U2 is short.

The image forming control portion 25 causes the image forming portion 10 to form an image on the basis of the print job acquired by the job acquisition portion 16. Specifically, the image forming control portion 25 compares the output-process-start distance D2 with the user distance L of the output-permitted user U1 to thereby determine whether or not the output-permitted user U1 exists in the output-process-start area A2 defined by the output-process-start distance D2. When it is determined that the output-permitted user U1 exists in the output-process-start area A2, the image forming control portion 25 compares the threshold value Th with the outsider-use-possibility P calculated by the outsider-use-possibility calculation portion 23. Subsequently, when it is determined that the outsider-use-possibility P is equal to or smaller than the threshold value Th, the image forming control portion 25 causes the image forming portion 10 to start an output process (image forming processing).

In addition, even when the outsider-use-possibility P is larger than the threshold value Th, the image forming control portion 25 causes the image forming portion 10 to start an output process in a case where it is detected by the user detection portion 19 that the user distance L of the output-permitted user U1 has become equal to or smaller than a predetermined distance. The predetermined distance mentioned here is set to a distance within which the output-permitted user U1 may reach out to the sheet (a short distance such as 0.5 m or 1 m) receiving tray 14. Namely, the image forming control portion 25, in a case where it is detected that the output-permitted user U1 has approached to a position where the output-permitted user U1 can acquire the output product ejected on the sheet receiving tray 14, causes image forming portion 10 to immediately start an output process, even though the outsider-use-possibility P is not equal to or lower than the threshold value Th.

Note that, in a case where the user detection portion 19 has detected that the user distance L of the output-permitted user U1 has become equal to or smaller than a predetermined distance, the image forming control portion 25 may perform a control of causing the outsider-use-possibility/threshold-value varying portion 24 to modify the threshold value Th to "0". The output process of output products by the image forming portion 10 is immediately started also when the image forming control portion 25 has performed such a control.

In addition, the image forming control portion 25 causes the image forming portion 10 to immediately start an output process also when it is detected that an ID or a password for login has been input to the operation portion 41 of the control panel 6 by the output-permitted user U1. Namely, the image forming control portion 25 controls the timing of causing the image forming portion 10 to start an output process, on the basis of the magnitude relation between the outsider-use-possibility P and the threshold value Th when the output-permitted user U1 has entered the output-process-start area A2, and contents of movement (operation) of the output-permitted user U1.

Furthermore, in a case where the print job acquired by the job acquisition portion 16 is the normal job J2, the image forming control portion 25 causes the image forming portion 10 to perform an output process relating to the normal job J2 without causing the login processing portion 22 to perform the authentication process.

Note that, in a case where the image forming portion 10 is in the power-saving mode when starting output process of the output product, the image forming control portion 25 causes the image forming portion 10 to start the image forming processing after having activated and warmed up the image forming portion 10.

The post-processing control portion 26 activates the post-processing device FN, on the basis of the job type/discriminated by the job type discrimination portion 17 to be set in the print job, and causes the post-processing device FN to perform predetermined post-processing on the output product.

<Processing by Image Forming Apparatus>

Figure 18:
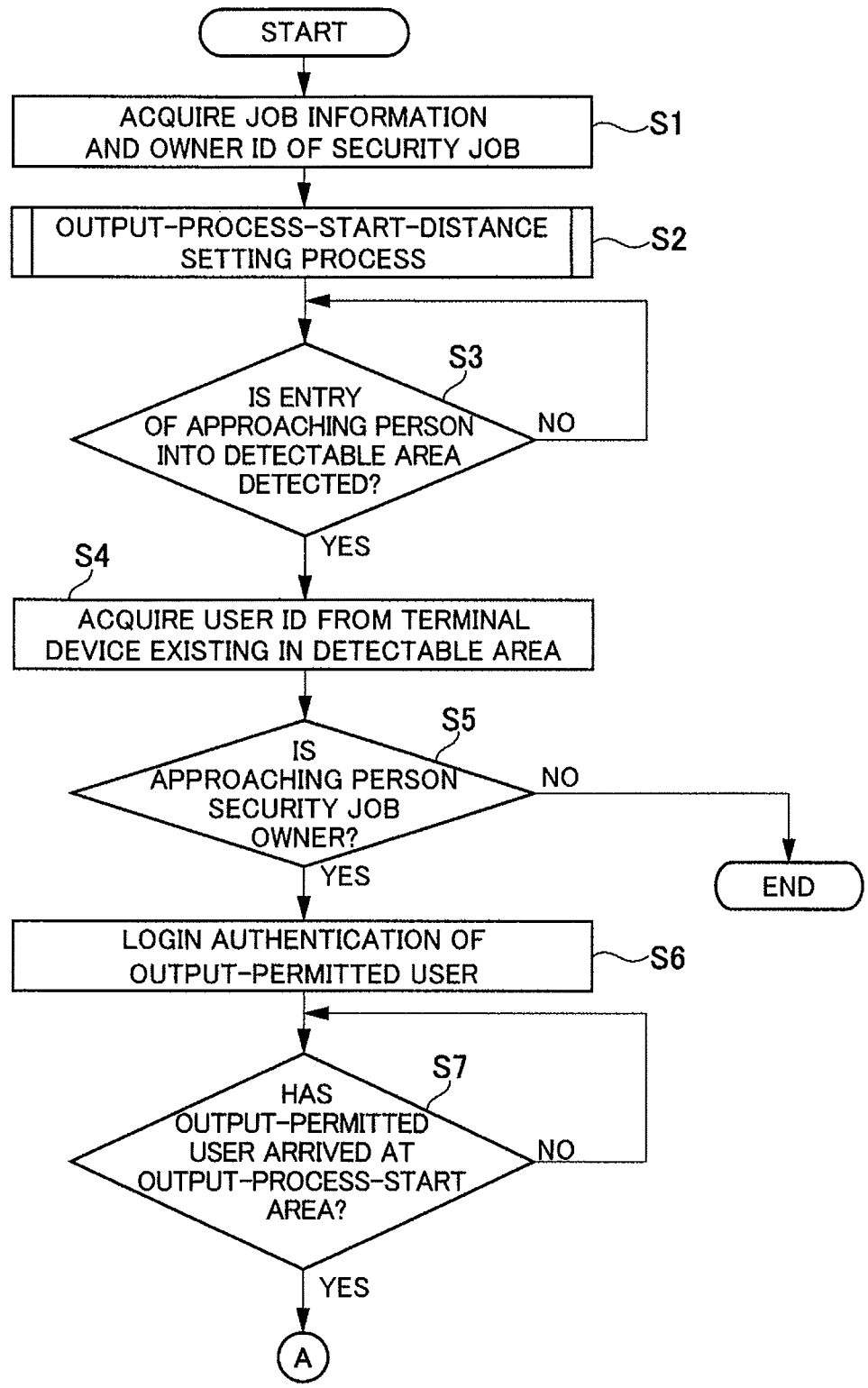
FIG. 18 is a flowchart illustrating an example of starting an output process by an image forming apparatus according to an embodiment of the present invention.
Figure 19:
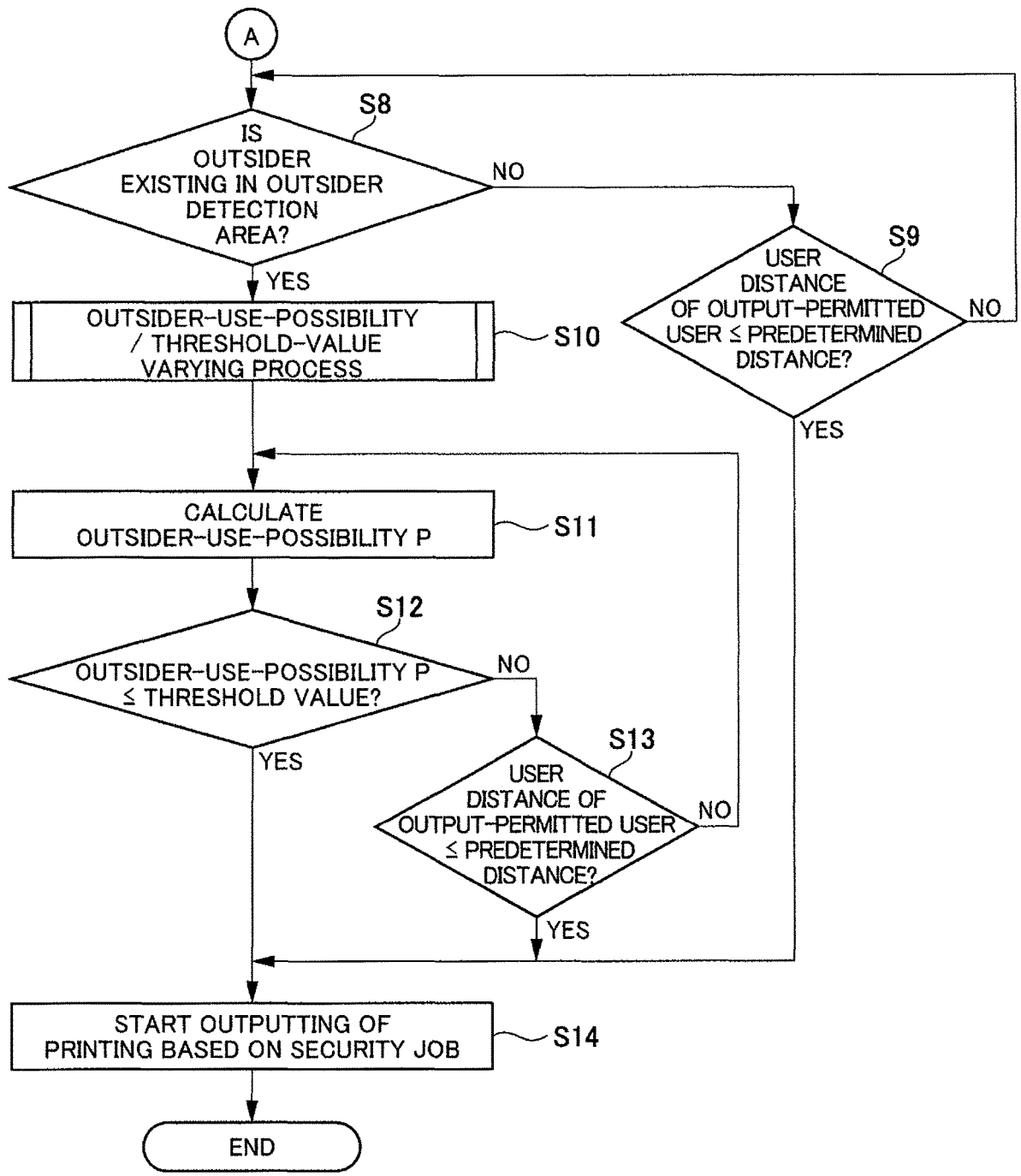
FIG. 19 is a flowchart illustrating an example of starting output process by an image forming apparatus according to an embodiment of the present invention.
Figure 20:
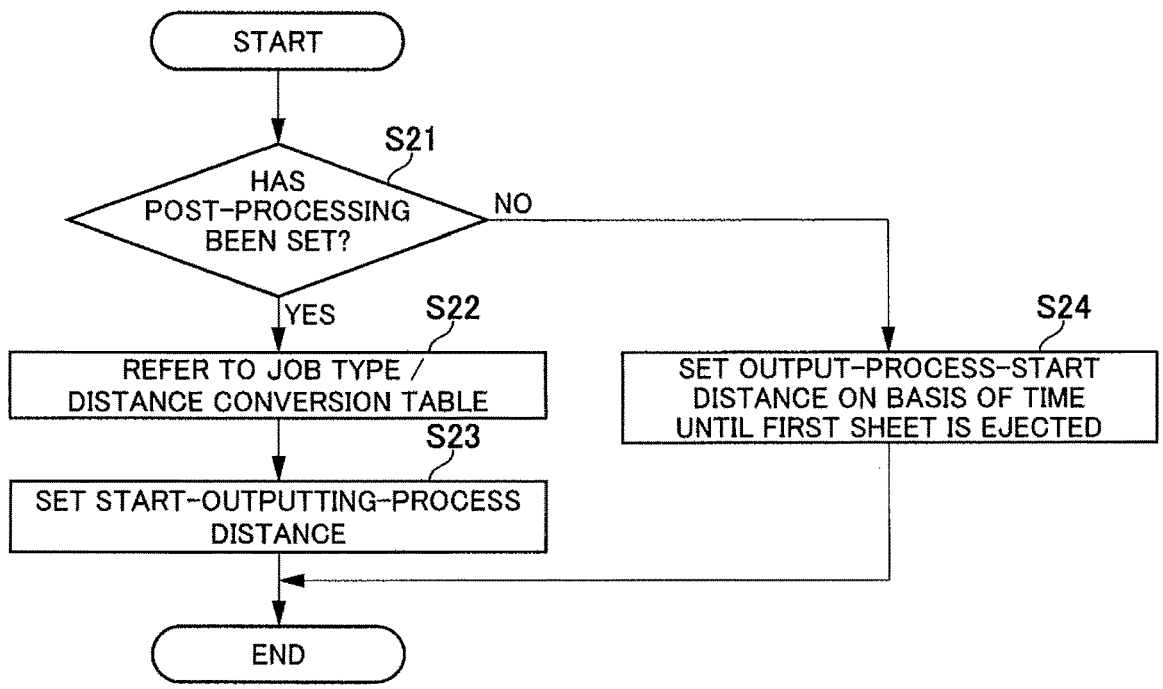
FIG. 20 is a flowchart illustrating an example of setting process of an output-process-start distance of an output product according to an embodiment of the present invention.
Figure 21:
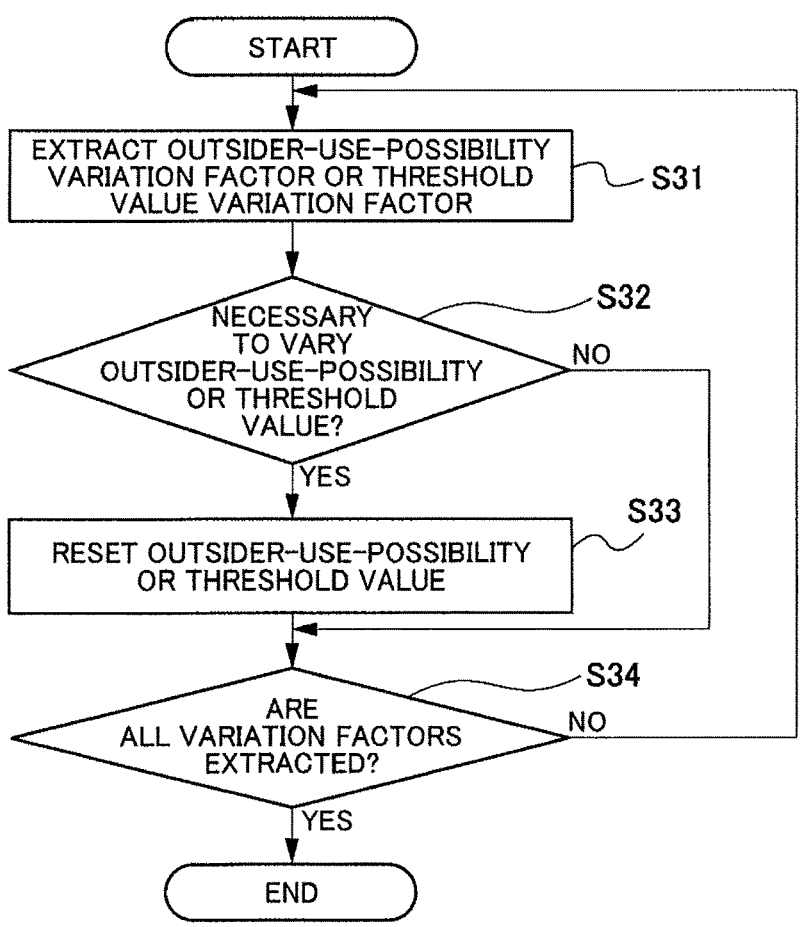
FIG. 21 is a flowchart illustrating an example of outsider-use-possibility/threshold-value varying process according to an embodiment of the present invention.

Next, an example of output-start process of output products executed by the image forming apparatus 2 of the image forming system 1 will be described with reference to FIGS. 18 to 21. FIGS. 18 and 19 are flowcharts illustrating a procedure of output-start process of the output product executed by the image forming apparatus 2, and FIG. 20 is a flowchart illustrating a procedure of output-process-start-distance setting process performed in the processing illustrated in FIG. 18. FIG. 21 is a flowchart illustrating a procedure of outsider-use-possibility/threshold-value varying process performed in the processing illustrated in FIG. 18.

Here, a description will be made by illustrating a case where the output-permitted user U1 has operated the PC terminal P1 and transmitted a single security job J1 to the image forming apparatus main body 3. Note that the processing illustrated in FIGS. 18 and 19 is performed even when the image forming portion 10 is in the power-saving mode.

First, the job acquisition portion 16 acquires the security job J1 from the PC terminal P1, and acquires job information and the owner ID of the owner of the security job J1 from the acquired security job J1 (step S1). The job information of the security job J1 includes information indicating the job type of the security job J1, information indicating the number-of-sheets-in-job which is set in the security job J1, information indicating the type (image type) of the image which is set in the security job J1, variation factors and variation elements of the threshold value Th of the outsider-use-possibility P, or the like.

Next, the output-process-start distance calculation portion 18 uses information of the job type of the security job J1 and/or information of the number-of-sheets-in-job acquired in step S1 to perform an output-process-start-distance setting process (step S2). The output-process-start-distance setting process sets the output-process-start distance D2 of the image forming apparatus 2 (the image forming apparatus main body 3 and the post-processing device FN). Details of the output-process-start-distance setting process will be described below with reference to FIG. 20.

After the processing of step S2, the user detection portion 19 starts detecting an approaching person (user) by utilization of radio waves transmitted from the terminal device 4 existing in the detectable area A1. Then, the user detection portion 19 determines whether or not entry of the approaching person into the detectable area A1 is detected (step S3). When entry of the approaching person into the detectable area A1 is not detected in step S3 (result of determination in step S3 is NO), the user detection portion 19 repeats the determination in step S3. On the other hand, when entry of the approaching person into the detectable area A1 is detected in step S3 (result of determination in step S3 is YES), the user detection portion 19 acquires the user ID transmitted from the terminal device 4 existing in the detectable area A1 (step S4).

Subsequently, the user determination portion 21 collates the owner ID of the security job J1 acquired in step S1 and the user ID acquired in step S4 to thereby determine whether or not the approaching person is a security job owner (the output-permitted user U1) (step S5). When it is determined in step S5 that the approaching person is not a security job owner (result of determination in step S5 is NO), the user determination portion 21 returns to the processing of step S4, and repeats the processing of step S4 and subsequent steps.

On the other hand, when it is determined in step S5 that the approaching person is a security job owner (result of determination in step S5 is YES), the user determination portion 21 supplies the content of determination to the login processing portion 22, and the login processing portion 22 performs login authentication of the output-permitted user U1 (step S6).

Then, the user detection portion 19 determines whether or not the output-permitted user U1 has reached the output-process-start area A2 defined by the output-process-start distance D2 which is set in step S2 (step S7). In the processing, first, the user detection portion 19 converts the strength of radio waves transmitted from the terminal device 4 possessed by the output-permitted user U1 into the user distance L, with reference to the radio wave strength/distance conversion table Ta3 (not illustrated). In addition, the user detection portion 19 compares the user distance L acquired by the conversion with the output-process-start distance D2 to thereby determine whether or not the output-permitted user U1 has reached the output-process-start area A2.

When it is determined in step S7 that the output-permitted user U1 has reached the output-process-start area A2 (result of determination in step S7 is YES), the user detection portion 19 performs the processing of step S8 in FIG. 19. On the other hand, when it is determined in step S7 that the output-permitted user U1 has not reached the output-process-start area A2 (result of determination in step S7 is NO), the user detection portion 19 repeats the determination processing of step S7.

When the result of determination in step S7 is YES, the user detection portion 19 determines whether or not the unpermitted user U2 (outsider) exists in the outsider detection area A3 (step S8). When it is determined in step S8 that the unpermitted user U2 does not exist in the outsider detection area A3 (result of determination in step S8 is NO), the user detection portion 19 determines whether or not the user distance L of the output-permitted user U1 is equal to or smaller than a predetermined distance (step S9).

When it is determined in step S9 that the user distance L of the output-permitted user U1 is larger than a predetermined distance (result of determination in step S9 is NO), the user detection portion 19 returns to the processing of step S8, and repeats the processing of step S8 and subsequent steps. On the other hand, when it is determined in step S9 that the user distance L of the output-permitted user U1 is equal to or smaller than a predetermined distance (result of determination in step S9 is YES), the processing of step S14 described below is performed.

On the other hand, when it is determined in step S8 that the unpermitted user U2 exists in the outsider detection area A3 (result of determination in step S8 is YES), the outsider-use-possibility/threshold-value varying portion 24 performs an outsider-use-possibility/threshold-value varying process (step S10). Details of the outsider-use-possibility/threshold-value varying process will be described below with reference to FIG. 21.

After the processing of step S10, the outsider-use-possibility calculation portion 23 calculates the outsider-use-possibility P (step S11). Specifically, the outsider-use-possibility calculation portion 23 acquires, from the movement trajectory calculation portion 20, information of the movement trajectory of the unpermitted user U2 in the outsider detection area A3 detected in step S8. Subsequently, the outsider-use-possibility calculation portion 23 calculates the outsider-use-possibility P, on the basis of the acquired information of the movement trajectory of the unpermitted user U2, with reference to the outsider-use-possibility table Ta4 (outsider-use-possibility tables Ta4_1 and Ta4_2 in FIG. 15).

Calculation of the movement trajectory of the unpermitted user U2 by the movement trajectory calculation portion 20 is performed for all of the unpermitted users U2 detected in the outsider detection area A3, regardless of whether or not the output-permitted user U1 has been detected in the detectable area A1, as described above. In step S11, the outsider-use-possibility calculation portion 23 extracts information of the movement trajectory relating to the unpermitted user U2 detected in step S8, from information of the movement trajectories of the respective unpermitted users U2 calculated and stored in the RAM 31 by the movement trajectory calculation portion 20. Then, the outsider-use-possibility calculation portion 23 calculates the outsider-use-possibility P, by the use of the extracted information of the movement trajectory relating to the unpermitted user U2.

Subsequently, the image forming control portion 25 determines whether or not the outsider-use-possibility P calculated in step S11 is equal to or smaller than the threshold value Th (step S12). When it is determined in step S12 that the outsider-use-possibility P is equal to or smaller than the threshold value Th (result of determination in step S12 is YES), the processing of step S14 described below is performed.

On the other hand, when it is determined in step S12 that the outsider-use-possibility P is larger than the threshold value Th (result of determination in step S12 is NO), the user detection portion 19 determines whether or not the user distance L of the output-permitted user U1 is equal to or smaller than a predetermined distance (step S13).

When it is determined in step S13 that the user distance L of the output-permitted user U1 is larger than a predetermined distance (result of determination in step S13 is NO), the processing returns to step S11, and the processing of step S11 and subsequent steps is repeated. When, on the other hand, it is determined in step S13 that the user distance L of the output-permitted user U1 is equal to or smaller than a predetermined distance (result of determination in step S13 is YES), the processing of step S14 and subsequent steps are performed.

When the result of determination in steps S9, S12, or S13 is YES, the image forming control portion 25 causes the image forming portion 10 to output-start process of the output product based on the security job J1 issued by the output-permitted user U1. Subsequently, after the processing of step S14, the image forming apparatus 2 completes the output-start process.

Note that, in a case where a post-processing process is set in the security job J1 acquired by the job acquisition portion 16 in step S1 in FIG. 18, the post-processing control portion 26 controls the post processing after the image forming portion 10 has performed the image forming processing. Additionally, in a case where the image forming apparatus 2 is in a power-saving mode when performing the processing of step S14, the image forming control portion 25 releases the power-saving mode and causes the image forming portion 10 to start the image forming processing after having activated the image forming apparatus 2.

Next, there will be described, with reference to FIG. 20, the setting process of the output-process-start distance D2 performed in step S2 during the output-start process of the output product described in FIGS. 18 and 19. First, the output-process-start distance calculation portion 18 determines whether or not post-processing is set in the security job J1 acquired in step S1 in FIG. 18 (step S21). When it is determined in step S21 that post-processing is set (result of determination in step S21 is YES), the output-process-start distance calculation portion 18 refers to the job type/distance conversion table Ta2 (refer to FIG. 12) (step S22). Subsequently, the output-process-start distance calculation portion 18 determines the output-process-start distance D2 on the basis of the job type of the security job J1 acquired in step S1 (step S23). Then, after the processing of step S23, the image forming apparatus 2 completes the output-process-start-distance setting process and returns to the processing of step S3 in FIG. 18.

When, for example, the job type of the security job J1 acquired in step S1 in FIG. 18 is "sheet folding", the output-process-start distance calculation portion 18 determines the output-process-start distance D2 to be "2 m". In addition, when the job type of the security job J1 acquired in step S1 is "cutting", the output-process-start distance calculation portion 18 determines the output-process-start distance D2 to be "1 m", referring to the job type/distance conversion table Ta2 illustrated in FIG. 12.

In addition, when two or more job types are set in the security job J1 acquired in step S1, the output-process-start distance calculation portion 18 determines, in step S23, the output-process-start distance D2 by summing all of the output-process-start distances D2 which have been set for respective job types. When, for example, the job types of the security job J1 acquired in step S1 are "sheet folding" and "cutting", the output-process-start distance calculation portion 18 determines the output-process-start distance D2 to be "3 m", which is the summed value of "2 m" associated with "sheet folding" and "1 m" associated with "cutting".

When, on the other hand, it is determined in step S21 that post-processing is not set in the security job J1 (result of determination in step S21 is NO), the output-process-start distance calculation portion 18 determines the output-process-start distance D2 on the basis of information of the time until the first sheet (first print) is ejected (step S24). Subsequently, after the processing of step S24, the image forming apparatus 2 terminates the output-process-start-distance setting process and returns to the processing of step S3 in FIG. 18.

After having determined the output-process-start distance D2, the output-process-start distance calculation portion 18 temporarily stores the determined output-process-start distance D2 in the RAM 31 in a form of a table associating the management number of the security jobs J1 with the owner ID of the security job J1.

Next, there will be described with reference to FIG. 21, the outsider-use-possibility/threshold-value varying process to be performed in step S10 during the output-start process of the output product described in FIGS. 18 and 19. First, the outsider-use-possibility/threshold-value varying portion 24 extracts a possibility-of-use variation factor or a threshold value variation factor from the security job J1 and the user ID of the unpermitted user U2 (step S31). Note that, in a case where the unpermitted user U2 is not holding the terminal device 4, the user ID of the unpermitted user U2 is not detected in step S31. In such a case, the possibility-of-use variation factor or the threshold value variation factor is extracted from only the security job J1 in step S31. Furthermore, the outsider-use-possibility/threshold-value varying portion 24 extracts elements from the respective variation factors extracted in step S31.

Subsequently, the outsider-use-possibility/threshold-value varying portion 24 determines whether or not it is necessary to vary the outsider-use-possibility P or the threshold value Th, on the basis of the possibility-of-use variation factor or the threshold value variation factor extracted in step S31 (step S32). Specifically, the outsider-use-possibility/threshold-value varying portion 24 determines whether the threshold value variation coefficient associated with the extracted element of the threshold value variation factor is "0" or not "0", with reference to the threshold value variation factor table Ta5 illustrated in FIG. 16, for example. When the threshold value variation coefficient is "0", it is not necessary to vary the threshold value Th.

When it is determined in step S32 that it is not necessary to vary the outsider-use-possibility P or the threshold value Th (result of determination in step S32 is NO), the outsider-use-possibility/threshold-value varying portion 24 performs the processing of step S34 describe below, without modifying the value of the threshold value Th. When, on the other hand, it is determined in step S32 that it is necessary to vary the outsider-use-possibility P or the threshold value Th, the outsider-use-possibility/threshold-value varying portion 24 resets the outsider-use-possibility P or the threshold value Th on the basis of a variation coefficient (step S33). After having reset the outsider-use-possibility P or the threshold value Th, the outsider-use-possibility/threshold-value varying portion 24 stores the reset outsider-use-possibility P or the threshold value Th in the RAM 31.

After the processing of step S33, or when the result of determination in step S32 is NO, the outsider-use-possibility/threshold-value varying portion 24 determines whether or not all of the variation factors have been extracted (step S34). When it is determined in step S34 that not all of the variation factors have been extracted (result of determination in step S34 is NO), the outsider-use-possibility/threshold-value varying portion 24 returns to the processing of step S31, and repeats the processing of step S31 and subsequent steps. On the other hand, when it is determined in step S34 that all of the variation factors have been extracted (result of determination in step S34 is YES), the outsider-use-possibility/threshold-value varying portion 24 terminates the outsider-use-possibility/threshold-value varying process and returns to the processing of step S11 in FIG. 19.

In the image forming apparatus 2 according to the present embodiment described above, the output process by the image forming portion 10 is started in a case where the output-permitted user U1 has been detected in the output-process-start area A2 and the outsider-use-possibility P has become equal to or smaller than the threshold value Th. Namely, the output process by the image forming portion 10 is not started when the outsider-use-possibility P is larger than the threshold value Th, even though the output-permitted user U1 has been detected in the output-process-start area A2. The output product is not output under a situation in which it is very likely that the security of the output product to be output on the basis of the security job J1 may be violated, such as a case where, for example, the unpermitted user U2 having an intention of using the image forming apparatus 2 is approaching the image forming apparatus 2. Therefore, in the present embodiment, it is possible to prevent the unpermitted user U2 who is very likely to use the image forming apparatus 2 (having an intention of using the image forming apparatus 2), from peeking at the output product which has been output on the basis of the security job J1.

Additionally, in the image forming system 1 according to the present embodiment, the output process is immediately started in a case where the outsider-use-possibility P is low, even though the unpermitted user U2 exists around the image forming apparatus 2 when the output-permitted user U1 has entered the output-process-start area A2. In addition, the output process is immediately started by the image forming portion 10 when it is detected that the output-permitted user U1 has come close to a reachable distance to the sheet receiving tray 14 of the image forming apparatus 2, or the output-permitted user U1 has operated the image forming apparatus 2.

Furthermore, in the image forming system 1 according to the present embodiment, the output-process-start distance calculation portion 18 modifies the output-process-start distance D2 that defines the output-process-start area A2, in accordance with the content of the job which is set in the security job J1. When the number-of-sheets-in-job which is set in the security job J1 is large or a complicated post-processing is set in the security job J1, for example, the output-process-start distance D2 becomes long, and also the range of the output-process-start area A2 becomes wide. In such a case, the output process of the printed matter by the image forming portion 10 is started, even though the output-permitted user U1 is at a position far from the image forming apparatus 2. When, on the other hand, the number-of-sheets-in-job is small or the post-processing is not set, the output-process-start distance D2 becomes short and also the range of the output-process-start area A2 becomes narrow. In such a case, the output process by the image forming portion 10 is started when the output-permitted user U1 has moved to a position close to the image forming apparatus 2.

Performing such a control allows the output-permitted user U1 to immediately retrieve the output product upon reaching the position of the image forming apparatus 2 (it becomes possible to have ejection of the output product based on the security job J1 to the sheet receiving tray 14 completed by the time the output-permitted user U1 reaches the position of the image forming apparatus 2). Therefore, according to the present embodiment, it is also possible to reduce the waiting time of the output-permitted user U1 until completion of output of the output product to be output on the basis of the security job J1, while ensuring the security of the output product based on the security job J1. Namely, the present embodiment realizes both ensuring the security of the output product which has been output on the basis of the security job J1 and enhancing the convenience for the output-permitted user U1.

Additionally, in the image forming system 1 according to the present embodiment, the outsider-use-possibility calculation portion 23 calculates the outsider-use-possibility P on the basis of the information of the movement trajectory of the unpermitted user U2 calculated by the movement trajectory calculation portion 20. As has been described above, the movement trajectory of the unpermitted user U2 varies depending on the whether or not the unpermitted user U2 has an intention of using the image forming apparatus 2. Therefore, according to the image forming system 1 according to the present embodiment, it is possible to determine with a high precision whether or not the unpermitted user U2 has an intention of using the image forming apparatus 2 and adjust, on the basis of the determination result, the timing of the output process of the printed matter to be an appropriate timing.

Additionally, in the image forming system 1 according to the present embodiment, the outsider-use-possibility/threshold-value varying portion 24 varies the outsider-use-possibility P or the threshold value Th, on the basis of various variation factors and elements such as information of the user ID of the unpermitted user U2, information of the time zone, information of the trust relationship between the output-permitted user U1 and the unpermitted user U2, or the like. Therefore, in the present embodiment, the timing of starting the output process by the image forming portion 10 may be adjusted to an appropriate timing in accordance with the situation.

Modification Example 1

Next, there will be described, with reference to FIGS. 22 to 26, the movement trajectory calculating process and the outsider-use-possibility calculating process performed by the image forming system according to modification example 1. Since the configuration of the image forming apparatus main body 3 of the image forming system is identical to that of the embodiment illustrated in FIG. 10, duplicative explanation of the configuration of the image forming apparatus main body 3 will be omitted.

Figure 22:
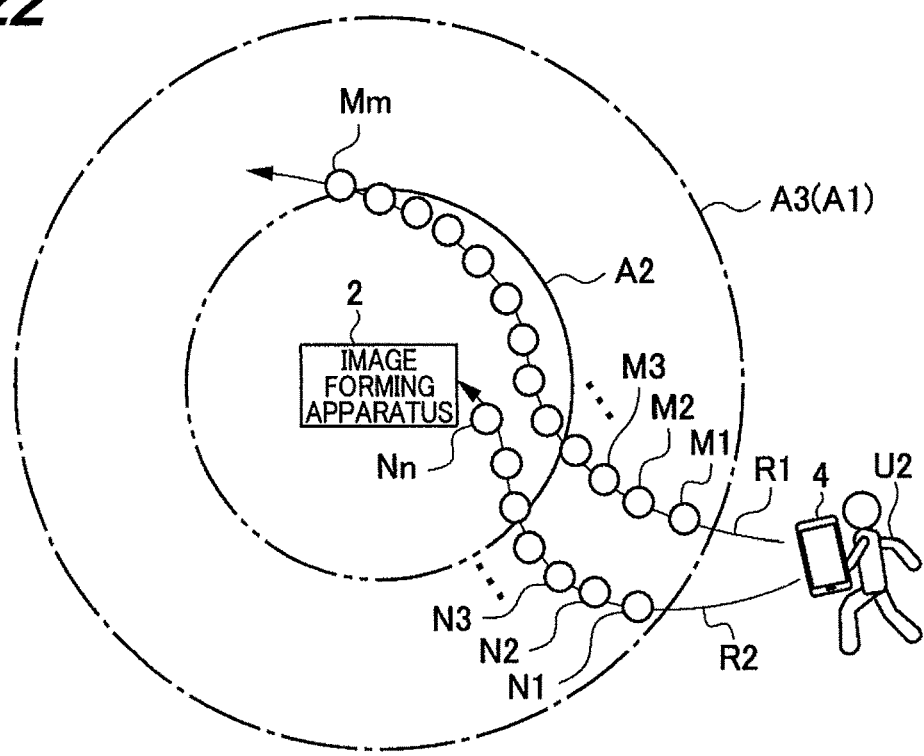
FIG. 22 is an explanatory diagram illustrating an example of movement trajectory of an outsider detected by an image forming apparatus of a modification example 1.

FIG. 22 illustrates an example of a movement trajectory of the unpermitted user U2 calculated by the movement trajectory calculation portion 20. The movement trajectory calculation portion 20 calculates a movement trajectory of the unpermitted user U2 by sampling positions of the unpermitted user U2 detected by the user detection portion 19 at every predetermined time, and connecting respective positions M obtained by the sampling. For example, in a case where the positions of the unpermitted user U2 sampled by the movement trajectory calculation portion 20 are positions M1, M2, M3, . . . , Mm (m is a natural number) illustrated in FIG. 22, the movement trajectory of the unpermitted user U2 turns into a movement trajectory R1 connecting the positions M1, M2, M3, . . . , Mm. Since the movement trajectory R1 is a trajectory indicating that the unpermitted user U2 exits from the output-process-start area A2 without reaching the image forming apparatus 2, as illustrated in FIG. 22, the unpermitted user U2 moving along the movement trajectory R1 is assumed to have no intention of using the image forming apparatus 2.

On the other hand, in a case where the positions of the unpermitted user U2 sampled by the movement trajectory calculation portion 20 are positions N1, N2, N3, . . . , Nn (n is a natural number) illustrated in FIG. 22, the movement trajectory of the unpermitted user U2 turns into a movement trajectory R2 connecting the positions N1, N2, N3, . . . , Nm. Since the movement trajectory R2 turns into a trajectory indicating that the unpermitted user U2 reaches the image forming apparatus 2, as illustrated in FIG. 22, the unpermitted user U2 moving along the movement trajectory R2 is assumed to have an intention of using the image forming apparatus 2.

Next, there will be described an example of the calculating process of the outsider-use-possibility P by the outsider-use-possibility calculation portion 23. First, the movement trajectory calculation portion 20 calculates the distance (user distance L) of the unpermitted user U2 to the target apparatus and the angle of movement direction, for respective positions of the unpermitted user U2 obtained by the sampling by the movement trajectory calculation portion 20. Then, the outsider-use-possibility calculation portion 23 calculates the outsider-use-possibility P, on the basis of the user distance L and the angle of movement direction of the unpermitted user U2. The outsider-use-possibility P is calculated, for example, as follows.

First, the outsider-use-possibility indicated by the distance between the image forming apparatus 2 and the unpermitted user U2 is defined as a distance dependence possibility PL [%]. Subsequently, the outsider-use-possibility indicated by the size of the angle indicating the movement direction of the unpermitted user U2 is defined as an angle dependence possibility Pθ [%]. Note that the angle dependence possibility Pθ varies in accordance with the user distance L.

Then, the outsider-use-possibility P is defined as the following formula (1).

$$P = PL + P\theta \quad (1)$$

Namely, the outsider-use-possibility P is a function with the distance dependence possibility PL and the angle dependence possibility Pθ being variables. The distance dependence possibility PL and the angle dependence possibility Pθ in the formula (1) respectively vary in a range of 0 to 50%. The outsider-use-possibility P is a summed value of the distance dependence possibility PL and the angle dependence possibility Pθ, and thus varies in a range of 0 to 100%.

Figure 23:
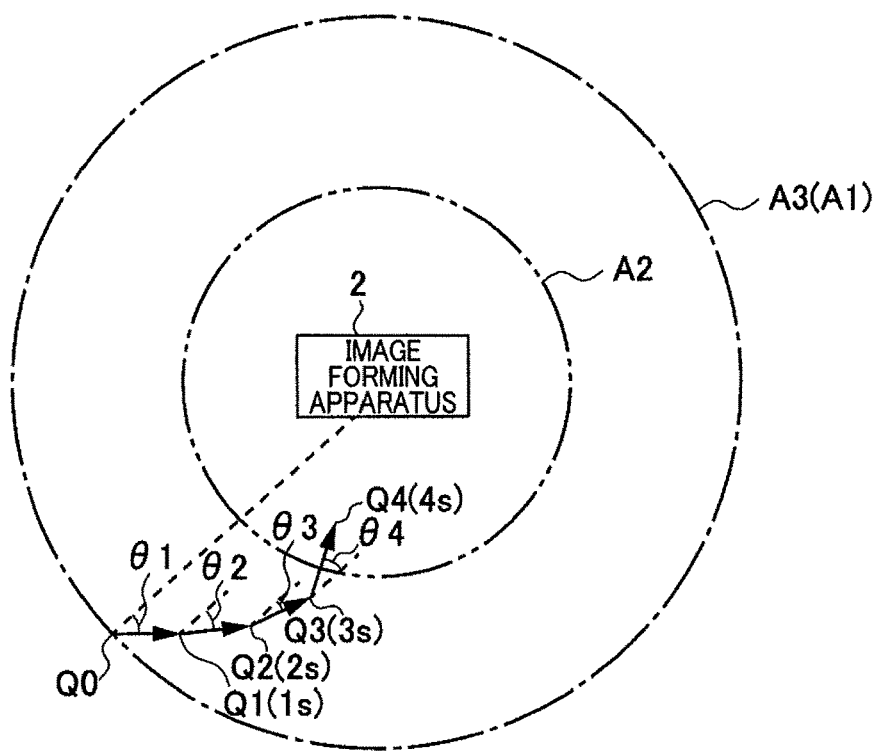
FIG. 23 is an explanatory diagram illustrating a concept of distance dependence possibility and angle dependence possibility used in outsider detection by an image forming apparatus of the modification example 1.

Here, the distance dependence possibility PL and the angle dependence possibility Pθ will be described with reference to FIG. 23. FIG. 23 is an explanatory diagram illustrating the concept of the distance dependence possibility PL and the angle dependence possibility Pθ. For example, in a case where a position Q0 of the unpermitted user U2 when the unpermitted user U2 has entered the outsider detection area A3 is the origin, the user distance L indicated by the dashed line connecting the origin Q0 and the image forming apparatus 2 is defined as the amount of change of the distance dependence possibility PL. In addition, in a case where the dashed line connecting the unpermitted user U2 and the image forming apparatus 2 is a base line, an angle θ formed by a vector indicating the movement direction of the unpermitted user U2 and the base line is defined as the amount of change of the angle dependence possibility Pθ.

For example, the length of the base line connecting the origin Q0 and the image forming apparatus 2 becomes equal to the user-detectable distance D1 illustrated in FIG. 2 at the time when the unpermitted user U2 has entered the outsider detection area A3. In addition, the angle θ of the movement direction of the unpermitted user U2 at the origin Q0 (initial value of angle θ) is set to 0 degree.

After the unpermitted user U2 has entered the outsider detection area A3, positions of the unpermitted user U2 is sampled (calculated) by the movement trajectory calculation portion 20 at every predetermined time. In addition, in the modification example 1, the user detection portion 19 calculates a position Q of the unpermitted user U2 by, for example, measuring the change in the radio wave strength being measured by a plurality of unillustrated wireless devices disposed around the image forming apparatus 2. The wireless devices can use, for example, access points. It is desirable that at least three wireless devices are disposed around the image forming apparatus 2.

Note that the user detection portion 19 may calculate position Q of the unpermitted user U2 by, for example, acquiring a pressure signal or the like emitted from a plurality of pressure sensitive sensors disposed on the floor surface of the image forming apparatus 2 and by using the acquired pressure signal. Alternatively, the user detection portion 19 may calculate the position Q of the unpermitted user U2 by acquiring an image captured by a camera attached to the image forming apparatus 2 or provided around the image forming apparatus 2 and by analyzing the acquired image.

The movement trajectory calculation portion 20 calculates the movement trajectory R of the unpermitted user U2 by the use of information of the position Q of the unpermitted user U2 detected by the user detection portion 19.

For example, there is assumed a case where the movement trajectory calculation portion 20 performs sampling of the positions Q of the unpermitted user U2 for each second. At this time, the unpermitted user U2 is assumed to be at a position Q1 one second after having entered the outsider detection area A3, at a position Q2 after two seconds, at a position Q3 after three seconds, and at a position Q4 after four seconds.

When the unpermitted user U2 existed at the position Q1, the angle θ indicating the movement direction of the unpermitted user U2 is expressed as an angle θ1 formed by the base line indicated by the dashed line and an arrow indicating the movement direction in which the unpermitted user U2 has moved from the position Q0 to the position Q1. Similarly, the angle θ of the movement direction of the unpermitted user U2 relative to the base line becomes angles θ2, θ3, and θ4, respectively when the unpermitted user U2 existed at the respective positions Q2, Q3, and Q4. The user distance L of the unpermitted user U2 becomes shorter as the unpermitted user U2 moves to the positions Q1, Q2 . . . and the like.

Figure 24:
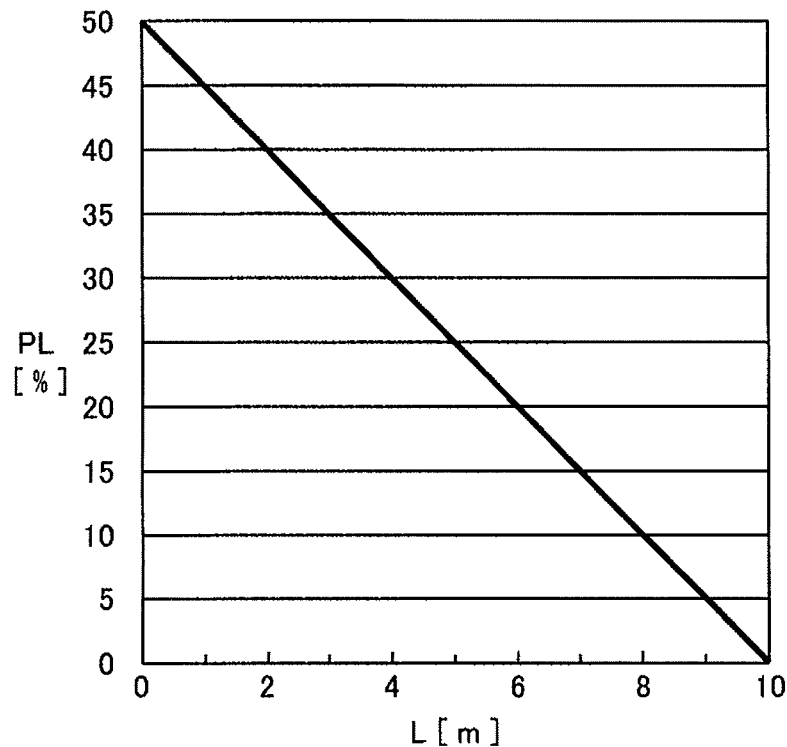
FIG. 24 is a graph illustrating a correspondence between distance dependence possibility and user distance in the modification example 1.

FIG. 24 is a graph illustrating correspondence relationship between the user distance L of the unpermitted user U2 and the distance dependence possibility PL. In the graph illustrated in FIG. 24, the user distance L taken along the horizontal axis and the distance dependence possibility PL is taken along the vertical axis. Here, there is assumed a case where the radius of the outsider detection area A3 is 10 m. The distance dependence possibility PL turns out to be 0% when the user distance L is 10 m, and 50% when the user distance L is 0 m. For intermediate values of the user distance L, the distance dependence possibility PL changes linearly. In other words, the shorter the user distance L of the unpermitted user U2 is, the higher the distance dependence possibility PL becomes.

In the example illustrated in FIG. 23, it is assumed that the unpermitted user U2 having an intention of using the image forming apparatus 2 may advance toward the image forming apparatus 2. Accordingly, the user distance L shortens as time passes when the unpermitted user U2 is advancing toward the image forming apparatus 2. Therefore, when the unpermitted user U2 has an intention of using the image forming apparatus 2, the distance dependence possibility PL becomes higher as the unpermitted user U2 approaches the image forming apparatus 2, and the distance dependence possibility PL turns out to be 50%, in the example illustrated in FIG. 24, when the unpermitted user U2 has arrived at the position of the image forming apparatus 2.

Figure 25:
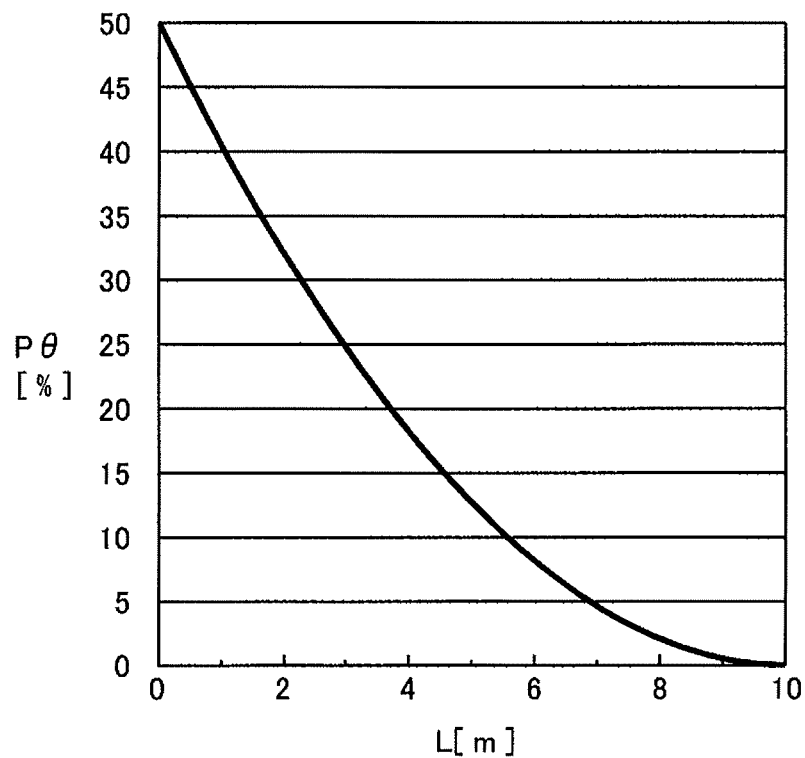
FIG. 25 is a graph illustrating a correspondence between angle dependence possibility and user distance in the modification example 1.

FIG. 25 is a graph illustrating the correspondence relationship between the user distance L of the unpermitted user U2 and the angle dependence possibility Pθ. In the graph illustrated in FIG. 25, the user distance L is taken along the horizontal axis and the angle dependence possibility Pθ is taken along the vertical axis. The angle dependence possibility Pθ turns out to be 0% when the user distance L is 10 m and 50% when the user distance L is 0 m. For the range in between, the angle dependence possibility Pθ varies nonlinearly, with the amount of change thereof becomes larger as the user distance L decreases.

When the unpermitted user U2 is at a position far from the image forming apparatus 2, the possibility that the unpermitted user U2 may intentionally approach the image forming apparatus 2 is assumed to be low even though the angle θ of the movement direction of the unpermitted user U2 is small. When, on the other hand, the unpermitted user U2 is at the position close to the image forming apparatus 2, the possibility that the unpermitted user U2 is intentionally approaching the image forming apparatus 2 is assumed to be high as the angle θ comes closer to 0 degree.

Accordingly, the user distance L decreases and the angle dependence possibility Pθ becomes high as the unpermitted user U2 approaches the image forming apparatus 2, in a case where the unpermitted user U2 is intentionally advancing toward the image forming apparatus 2. Then, when the unpermitted user U2 has arrived at the image forming apparatus 2, the user distance L turns out to be 0 m, and the angle dependence possibility Pθ becomes 50%.

Figure 26:
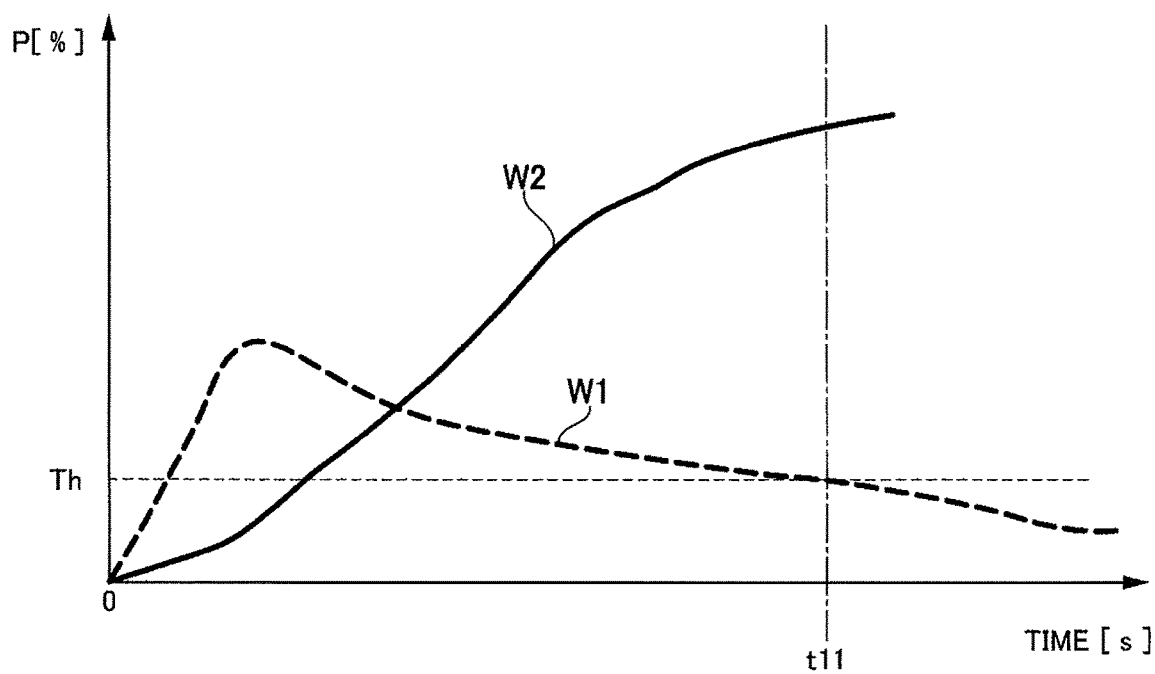
FIG. 26 is a graph illustrating a relation between availability and threshold value according to modification example 1.

FIG. 26 is a graph illustrating the relation between the outsider-use-possibility P calculated in the above example and the threshold value Th. The horizontal axis indicates the elapsed time since the unpermitted user U2 was detected in the outsider detection area A3, and the vertical axis indicates the outsider-use-possibility P (%). The movement trajectory calculation portion 20 starts calculation of the movement trajectory of the unpermitted user U2 when the unpermitted user U2 reaches the outsider detection area A3 (the time point illustrated at the origin Q0 in FIG. 23). Subsequently, the outsider-use-possibility calculation portion 23 calculates the outsider-use-possibility P, using the information of the movement trajectory calculated by the movement trajectory calculation portion 20.

For example, when the unpermitted user U2 who has entered the outsider detection area A3 moves away from the image forming apparatus 2 before reaching the image forming apparatus 2 as indicated by the movement trajectory R1 in FIG. 22, the outsider-use-possibility P transits along the trajectory indicated by a dashed line W1. In other words, although the possibility-of-use P rises immediately after the unpermitted user U2 has entered the outsider detection area A3, but the possibility-of-use P falls as time elapses, and the outsider-use-possibility P becomes a value equal to or smaller than the threshold value Th at and after a time point t11. Subsequently, when the outsider-use-possibility P has fallen below the threshold value Th, the output process of printing by the image forming portion 10 is started.

On the other hand, when the unpermitted user U2 who has entered the outsider detection area A3 moves in the direction of the image forming apparatus 2 as indicated by the movement trajectory R2 in FIG. 22, the outsider-use-possibility P transits along the trajectory indicated by a solid line W2. In other words, the outsider-use-possibility P continues rising as time elapses and never falls below the threshold value Th. Even in such a case, however, the output process of the printed matter is started on the basis of the security job J1 issued by the output-permitted user U1 when the user distance L of the output-permitted user U1 has becomes equal to or smaller than a predetermined distance, as has been described in the aforementioned embodiment.

According to the image forming system of the modification example 1 described above, it is possible to determine, with a higher precision, whether or not the unpermitted user U2 existing around the image forming apparatus 2 has an intention of using the image forming apparatus 2.

Other Various Modification Examples

Figure 27A:
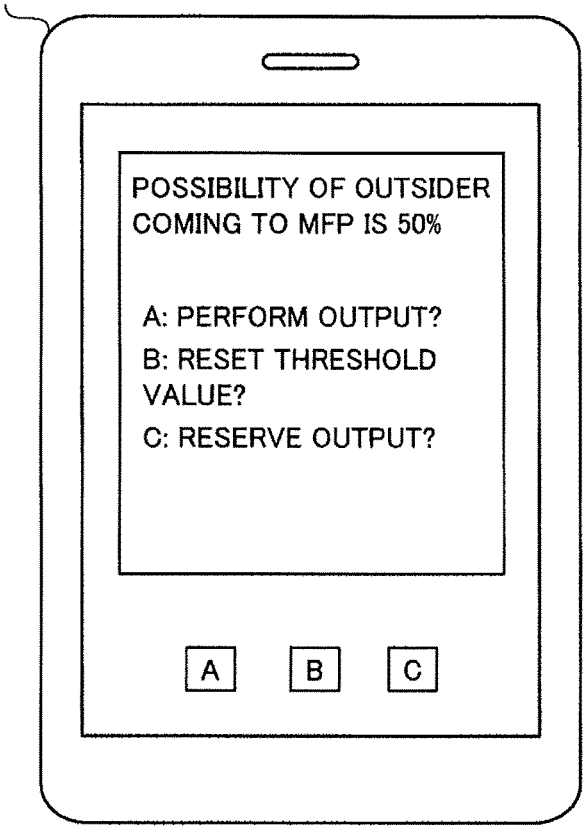
FIG. 27 is an explanatory diagram illustrating an example of notification displayed on the terminal device when prompting the output-permitted user to determine a threshold value of outsider-use-possibility in the Modification example 2.
Figure 27B:
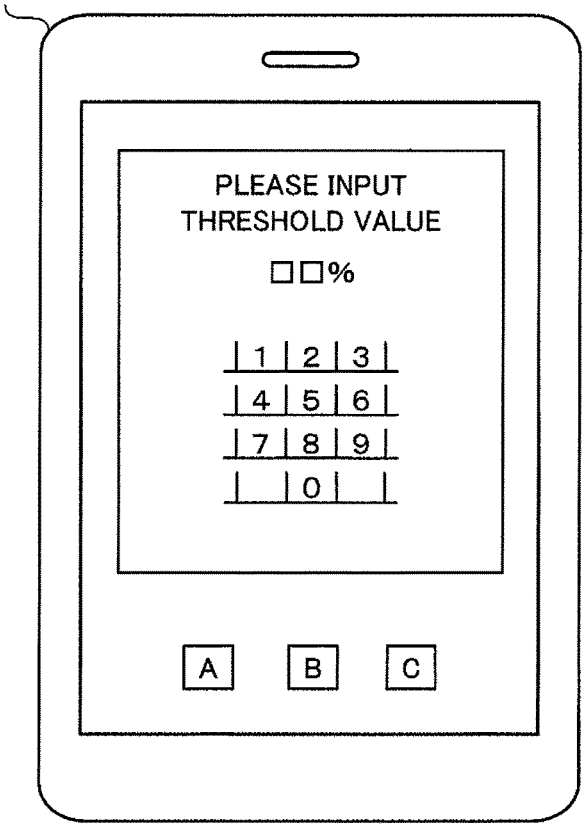

Note that, although the embodiments described above have described examples in which the outsider-use-possibility/threshold-value varying portion 24 varies the threshold value Th of the outsider-use-possibility P, on the basis of the information of the factors and elements that cause the outsider-use-possibility P or the threshold value Th to vary, the present invention is not limited thereto. For example, there may be a configuration allowing the output-permitted user U1 to set the threshold value Th. FIGS. 27A and 27B illustrate an exemplary presentation of a notification on the display screen of the terminal device 4 by the image forming apparatus 2 promoting the output-permitted user U1 to adjust the threshold value Th. The display screen of the terminal device 4 in FIG. 27A has a message "Possibility of an outsider coming to MFP is 50%. Please choose from A: Perform output B: Reset threshold value C: Reserve output" displayed thereon. The message notifies the degree of the possibility-of-use P of the image forming apparatus 2 by the unpermitted user U2 existing around the image forming apparatus 2, and provides the output-permitted user U1 with options for determining subsequent processing.

Respective letters "A", "B", and "C" are displayed on the lower part of the area where the message is displayed. The display area of the letters is formed as an instruction input area which is selectable by the output-permitted user U1. The output-permitted user U1 is therefore allowed to choose from: directly starting output of the output product, modifying the threshold value Th, or reserving output of the output product, by selecting any one of the letters "A", "B", and "C".

FIG. 27B illustrates an exemplary presentation on the display screen after selecting "B" by the output-permitted user U1. The display screen illustrated in FIG. 27B has numbers for inputting the threshold value displayed thereon, together with a message "Please input threshold value". Performing such a presentation prompting the output-permitted user U1 to input the threshold value Th allows the threshold value Th to be modified to a desired value. In other words, it is possible to set the threshold value Th to a value reflecting the intention of the output-permitted user U1.

In addition, although an example has been provided in the aforementioned embodiment in which the outsider-use-possibility calculation portion 23 calculates the outsider-use-possibility P using the information of the movement trajectory of the unpermitted user U2 calculated by the movement trajectory calculation portion 20, the present invention is not limited thereto. There may be, for example, a configuration in which the outsider-use-possibility calculation portion 23 calculates the outsider-use-possibility P, using the information of the speed of movement of the unpermitted user U2. The speed of movement of the unpermitted user U2 can be detected by the user detection portion 19, for example.

Specifically, the outsider-use-possibility calculation portion 23 sets the outsider-use-possibility P to a high value exceeding the threshold value Th, in a case where the walking speed of the unpermitted user U2 is equal to or faster than a predetermined speed. Performing such a control prevents execution of the output process by the image forming portion 10 in a situation such that, for example, the unpermitted user U2 overtakes the output-permitted user U1 from behind and moves toward the image forming apparatus 2. Note that, when the walking speed of the unpermitted user U2 is equal to or faster than a predetermined speed, the image forming control portion 25 may perform a control to stop the output process by the image forming portion 10 instead of varying the value of the outsider-use-possibility P.

In addition, although an example has been provided in the aforementioned embodiment in which the outsider-use-possibility/threshold-value varying portion 24 varies the possibility P or the threshold value Th in accordance with the situation, the present invention is not limited thereto. A fixed value of the threshold value Th may be always used, instead of varying the threshold value Th.

Note that the present invention is not limited to the embodiments described above and it goes without saying that it may take the form of other various applications or variations as long as it does not deviate from the spirit of the present invention according to the appended claims. For example, each of the embodiments described above is a detailed and specific description of the configuration of the apparatus and system to provide a comprehensible explanation of the present invention, and is not intended to include all of the components described. In addition, the control lines and information lines indicated by the solid lines in the drawings are presented whenever considered necessary for explanation, and not all of the control lines and information lines are always presented on the product. Actually, it may be considered that almost all of the components are interconnected.

In addition, a part or all of the components, functions, processing portions, or the like, relating to the control of the image forming apparatus described above may be realized by hardware, such as by the design of an integrated circuit, for example. In addition, the respective components, functions, or the like, relating to the control described above may be realized by interpreting and executing, by a processor, programs that realize respective functions, in other words by software. Note that the programs, tables, information (data) such as files that realize respective functions may be stored in a storage device such as a memory, a hard disk, an SSD (Solid State Drive), or a recording medium such as an IC card, an SD card, a DVD, or the like.

Although the present invention has been described and illustrated in detail, it is clearly understood that the same is by way of illustrated and example only and is not to be taken by way limitation, the scope of the present invention being interpreted by terms of the appended claims.

What is claimed is:

1. An image forming apparatus configured to consider a presence or lack thereof of both an output-permitted user and an outsider when determining whether to permit an image forming processing by the image forming apparatus, the image forming apparatus comprising:
    a job acquisition portion configured to acquire a print job issued from a communication terminal operated by an output-permitted user;
    an image forming portion configured to perform image forming processing to form an image on a sheet on a basis of the print job;
    a user detection portion configured to detect a person existing in a detectable area;
    a user determination portion configured to determine whether or not the person detected by the user detection portion is the output-permitted user who has issued a security job that requires user authentication, wherein the user determination portion uses a predetermined device associated with the output-permitted user to determine whether or not the person detected by the user detection portion is the output-permitted user;
    an authentication portion configured to authenticate the person who has been determined to be the output-permitted user by the user determination portion;
    an outsider detection portion configured to detect an outsider other than the output-permitted user existing in an outsider detection area that is adjacent the image forming apparatus;
    an output-process-start distance calculation portion configured to calculate, on a basis of a content of the security job acquired by the job acquisition portion, an output-process-start distance defining an output-process-start area in which the image forming portion is allowed to perform image forming processing based on the security job;
    a movement trajectory calculation portion configured to calculate a trajectory of movement of the outsider detected by the outsider detection portion;
    an outsider-use-possibility calculation portion configured to calculate, on a basis of the movement trajectory calculated by the movement trajectory calculation portion, an outsider-use-possibility indicating a possibility of using the image forming apparatus by the outsider; and
    an image forming control portion configured to perform a control of causing the image forming portion to perform image forming processing based on the security job issued by the output-permitted user, when both (1) the outsider-use-possibility calculated by the outsider-use-possibility calculation portion becomes equal to or smaller than a predetermined threshold value and (2) the output-permitted user has been detected in the output-process-start area when an outsider exists in the outsider detection area.

2. The image forming apparatus according to claim 1, wherein the movement trajectory calculation portion acquires a movement direction of the output-permitted user relative to the image forming apparatus, or both the movement direction of the output-permitted user relative to the image forming apparatus and a distance between the output-permitted user and the image forming apparatus, and calculates a trajectory of movement of the outsider on a basis of the acquired movement direction, or both the acquired movement direction and the distance.

3. The image forming apparatus according to claim 1, wherein the image forming control portion causes the image forming portion to perform image forming processing based on the security job issued by the output-permitted user in a case where the distance between the output-permitted user and the image forming apparatus has become equal to or smaller than a preliminarily set threshold distance, or it is detected that the image forming apparatus has been operated by the output-permitted user, even when the outsider-use-possibility calculated by the outsider-use-possibility calculation portion is larger than the threshold value.

4. The image forming apparatus according to claim 1, further comprising an outsider-use-possibility/threshold-value varying portion configured to modify the value of the outsider-use-possibility or the threshold value.

5. The image forming apparatus according to claim 4, wherein the outsider-use-possibility/threshold-value varying portion varies the outsider-use-possibility or the threshold value, in accordance with identification information of the output-permitted user who has been set in the security job.

6. The image forming apparatus according to claim 4, wherein the outsider-use-possibility/threshold-value varying portion varies the outsider-use-possibility or the threshold value, on a basis of information of schedule of the outsider and information of time zone, acquired on a basis of identification information of the outsider who has been transmitted from a communication terminal operated by the outsider detected by the outsider detection portion.

7. The image forming apparatus according to claim 4, wherein the outsider-use-possibility/threshold-value varying portion varies the threshold value, in accordance with height of a security level which has been set in the security job.

8. The image forming apparatus according to claim 6, wherein the outsider-use-possibility/threshold-value varying portion modifies the threshold value by use of threshold value variation coefficients which have been preliminarily set respectively to height of relationship between the output-permitted user and the outsider, on a basis of identification information of the output-permitted user and identification information of the outsider.

9. The image forming apparatus according to claim 4, where the outsider-use-possibility/threshold-value varying portion varies the threshold value in accordance with a distance between the output-permitted user and the target apparatus.

10. The image forming apparatus according to claim 4, wherein the outsider-use-possibility/threshold-value varying portion modifies the threshold value in accordance with contents of instructions that have been input to the communication terminal by the output-permitted user.

11. The image forming apparatus according to claim 1, wherein the trajectory of movement of the outsider includes a movement direction of the outsider.

12. The image forming apparatus according to claim 1, wherein the predetermined device is a wireless communication device.

13. A nontransitory computer-readable recording medium storing a program causing a computer to executes processes of:
    acquiring a print job issued from a communication terminal operated by an output-permitted user;
    detecting a person existing in a detectable area;
    determining whether or not the person detected in the detectable area is the output-permitted user who has issued a security job that requires user authentication, wherein the determining is accomplished with a predetermined device associated with the output-permitted user to determine whether or not the person detected by the user detection portion is the output-permitted user;
    authenticating the person who has been determined to be the output-permitted user;
    detecting an outsider other than the output-permitted user existing in an outsider detection area that is adjacent the image forming apparatus;
    calculating, on a basis of the content of the security job acquired from the communication terminal, an output-process-start distance defining an output-process-start area in which an image forming portion is allowed to perform image forming processing based on the security job;
    calculating a trajectory of the movement of the outsider detected in the outsider detection area;
    calculating, on a basis of the calculated movement trajectory, an outsider-use-possibility indicating a possibility of using the image forming apparatus by the outsider; and
    comparing the calculated outsider-use-possibility with a preliminarily set threshold value, and causing the image forming portion to perform image forming processing based on the security job issued by the output-permitted user in a case where the outsider-use-possibility calculated by the outsider-use-possibility calculation portion becomes equal to or smaller than a predetermined threshold value and also the output-permitted user has been detected in the output-process-start area when an outsider exists in the outsider detection area.

14. The nontransitory computer-readable recording medium according to claim 13, wherein the predetermined device is a wireless communication device.

15. An image forming system comprising an image forming apparatus configured to form an image on a sheet, and a terminal device configured to transmit identification information of a user,
    the image forming apparatus including:
    a job acquisition portion configured to acquire a print job issued from a communication terminal operated by a user;
    an image forming portion configured to perform image forming processing to form an image on a sheet on a basis of the print job;
    a user detection portion configured to detect the user existing in a detectable area;
    a user determination portion configured to determine whether or not the user detected by the user detection portion is an output-permitted user who has issued a security job that requires user authentication, wherein the user determination portion uses a predetermined device associated with the output-permitted user to determine whether or not the person detected by the user detection portion is the output-permitted user;
    an authentication portion configured to authenticate the user who has been determined to be the output-permitted user by the user determination portion;
    an outsider detection portion configured to detect an outsider other than the output-permitted user existing in an outsider detection area that is adjacent the image forming apparatus;
    an output-process-start distance calculation portion configured to calculate, on a basis of the content of the security job acquired by the job acquisition portion, an output-process-start distance defining an output-process-start area in which the image forming portion is allowed to perform image forming processing based on the security job;
    a movement trajectory calculation portion configured to calculate a trajectory of movement of the outsider detected by the outsider detection portion;
    an outsider-use-possibility calculation portion configured to calculate, on a basis of the movement trajectory calculated by the movement trajectory calculation portion, an outsider-use-possibility indicating a possibility of using the image forming apparatus by the outsider; and
    an image forming control portion configured to perform a control of causing the image forming portion to perform image forming processing based on the security job issued by the output-permitted user, in a case where the outsider-use-possibility calculated by the outsider-use-possibility calculation portion becomes equal to or smaller than a predetermined threshold value and also the output-permitted user has been detected in the output-process-start area when an outsider exists in the outsider detection area.

16. The image forming system according to claim 15, wherein the movement trajectory calculation portion acquires a movement direction of the output-permitted user relative to the image forming apparatus, or both the movement direction of the output-permitted user relative to the image forming apparatus and a distance between the output-permitted user and the image forming apparatus, and calculates a trajectory of movement of the outsider on a basis of the acquired movement direction, or both the acquired movement direction and the distance.

17. The image forming system according to claim 15, wherein the image forming control portion causes the image forming portion to perform image forming processing based on the security job issued by the output-permitted user in a case where the distance between the output-permitted user and the image forming apparatus has become equal to or smaller than a preliminarily set threshold distance, or it is detected that the image forming apparatus has been operated by the output-permitted user, even when the outsider-use-possibility calculated by the outsider-use-possibility calculation portion is larger than the threshold value.

18. The image forming system according to claim 15, further comprising an outsider-use-possibility/threshold-value varying portion configured to modify the value of the outsider-use-possibility or the threshold value.

19. The image forming system according to claim 18, wherein the outsider-use-possibility/threshold-value varying portion varies the outsider-use-possibility or the threshold value, in accordance with identification information of the output-permitted user who has been set in the security job.

20. The image forming system according to claim 18, wherein the outsider-use-possibility/threshold-value varying portion varies the outsider-use-possibility or the threshold value, on a basis of information of schedule of the outsider and information of time zone, acquired on a basis of identification information of the outsider who has been transmitted from a communication terminal operated by the outsider detected by the outsider detection portion.

21. The image forming system according to claim 18, wherein the outsider-use-possibility/threshold-value varying portion varies the threshold value, in accordance with height of a security level which has been set in the security job.

22. The image forming system according to claim 20, wherein the outsider-use-possibility/threshold-value varying portion modifies the threshold value by use of threshold value variation coefficients which have been preliminarily set respectively to height of relationship between the output-permitted user and the outsider, on a basis of identification information of the output-permitted user and identification information of the outsider.

23. The image forming system according to claim 18, where the outsider-use-possibility/threshold-value varying portion varies the threshold value in accordance with a distance between the output-permitted user and the image forming apparatus.

24. The image forming system according to claim 18, wherein the outsider-use-possibility/threshold-value varying portion modifies the threshold value in accordance with contents of instructions that have been input to the communication terminal by the output-permitted user.

25. The image forming apparatus according to claim 15, wherein the predetermined device is a wireless communication device.

* * * * *